US00RE36119E

United States Patent [19]

Kunishima et al.

[11] E Patent Number: Re. 36,119

[45] Reissued Date of Patent: Mar. 2, 1999

[54] SOLENOID VALVE UNIT FOR FUEL INJECTION APPARATUS

[75] Inventors: Akira Kunishima; Tomiaki Hasebe; Hideya Kikuchi; Etsuro Hozumi, all of Higashi-Matsuya; Takeo Kushida, Higashi-Matusya, all of Japan

[73] Assignee: Zexel Corporation, Japan

[21] Appl. No.: 874,611

[22] Filed: Jun. 13, 1997

Related U.S. Patent Documents

Reissue of:

[64] Patent No.: 5,558,068
Issued: Sep. 24, 1996
Appl. No.: 452,133
Filed: May 26, 1995

[30] Foreign Application Priority Data

May 31, 1994 [JP] Japan ..... 6-139729
Jan. 9, 1995 [JP] Japan ..... 7-016351

[51] Int. Cl.[6] ..... F02M 37/04; F02N 17/00

[52] U.S. Cl. ..... 123/516; 123/179.17

[58] Field of Search ..... 123/506, 179.16, 123/179.17, 510–513, 514, 516, 456, 458, 491

[56] References Cited

U.S. PATENT DOCUMENTS

| | | | |
|---|---|---|---|
| 4,807,583 | 2/1989 | Thorthwaite | 123/510 |
| 4,872,438 | 10/1989 | Ausiello et al. | 123/510 |
| 5,014,673 | 5/1991 | Fujimoto et al. | 123/179.16 |
| 5,033,441 | 7/1991 | Hain | 123/179.17 |
| 5,207,203 | 5/1993 | Wagner et al. | 123/514 |
| 5,327,872 | 7/1994 | Morikawa | 123/514 |
| 5,373,829 | 12/1994 | Schuers et al. | 123/510 |

FOREIGN PATENT DOCUMENTS

| | | | |
|---|---|---|---|
| 57-200663 | 12/1982 | Japan | 123/516 |
| 58-48768 | 3/1983 | Japan | 123/516 |
| 60-56872 | 4/1985 | Japan . | |
| 5-321782 | 12/1993 | Japan . | |

*Primary Examiner*—Thomas N. Moulis
*Attorney, Agent, or Firm*—Ostrolenk, Faber, Gerb & Soffen, LLP

[57] ABSTRACT

A solenoid valve unit for a fuel injection apparatus suppresses fuel vaporization when the engine is being started or restarted when hot and enhances the reliability of engine operation by providing a stable fuel delivery during engine startup.

27 Claims, 16 Drawing Sheets

| Operating states of elements | | | | | pump |
|---|---|---|---|---|---|
| Element / Enging state | 8 | 21 | 9 | 33 | |
| Starting | ON | Open | ON | Closed | Low-pressur pump4 |
| Started | OFF | Closed | OFF | Open | High-pressure pump5 |

FIG. 6

| Operating states of elements | | | | | pump |
|---|---|---|---|---|---|
| Element / Enging state | 51 | 21 | 9 | 33 | |
| Starting | OFF | Open | ON | Closed | Low-pressur pump4 |
| Started | ON | Closed | OFF | Open | High-pressure pump5 |
| Normal high-pressure operation | OFF | Closed | OFF | Open | High-pressure pump5 |
| Stopped | OFF | Closed ▶open | OFF | Open | ——— |

| Operating states of elements | | | | pump |
|---|---|---|---|---|
| Element / Enging state | 62 | 21 | 33 | |
| Starting | OFF | Open | Closed | Low-pressur pump4 |
| Started | ON | Closed | Open | High-pressure pump5 |
| Normal high-pressure operation | OFF | Closed | Open | High-pressure pump5 |
| Stopped | OFF | Closed ▸Open | Closed ▸Open | ———— |

| Operating states of elements | | | | pump |
|---|---|---|---|---|
| Element / Enging state | 143 | 21 | 142 | |
| Starting | ON | Open | Closed | Low-pressur pump4 |
| Started | OFF | Closed | Open | High-pressure pump5 |
| Normal high-pressure operation | OFF | Closed | Open | High-pressure pump5 |
| Normal low-pressure operation | ON | Open | Closed | Low-pressur pump4 |
| Stopped | OFF | Closed | Closed | ——— |

SOLENOID VALVE UNIT FOR FUEL INJECTION APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a fuel injection apparatus, and particularly to a solenoid valve unit for a fuel injection apparatus, and more particularly to a solenoid valve unit for a fuel injection apparatus that provides appropriate control of cylinder fuel pressure in a gasoline injection system during engine stamp and normal engine operation.

2. Prior Art Statement

With a conventional cylinder fuel injection system, when the engine has been stopped and is restarted while still hot (i.e., a hot restart), problems have been caused by fuel (gasoline, for example) being vaporized in the fuel piping owing to the high temperature in the engine compartment. This has led to a demand for a system that can maintain stable fuel pressure and prevent fuel vaporization during a hot restart. In particular, when a high-pressure pump driven by the rotation of the engine is used to inject fuel, at low engine speeds the fuel injection amount decreases, making it difficult to prevent fuel vaporization during a hot restart.

JPA 5-321782 discloses a fuel injection apparatus that is able to maintain a constant pressure on the intake side of a high-pressure pump by providing a pressure control valve between a high-pressure pump and a low-pressure pump, and returning fuel from an overflow valve in the high-pressure pump to the pressure control valve. Mechanical pressure flow control valves have been disclosed, such as, for example, by JPA 60- 56872. These mechanical pressure valves are arranged so that fuel is injected via a common rail when the pressure of the fuel being delivered from the pump exceeds the force exerted by a valve spring.

An object of a first aspect of the invention is to provide a solenoid valve unit for a fuel injection apparatus that suppresses fuel vaporization when an engine is subjected to a hot restart and reliably improves engine operation, by providing a stable fuel delivery when the engine is started.

A further object of the first aspect of the invention is to provide a solenoid valve unit for a fuel injection apparatus that can pump fuel at low pressure when the engine is started and change over to high-pressure delivery during normal engine operation.

A further object of the first aspect of the invention is to provide a solenoid valve unit for a fuel injection apparatus that can pump fuel at low pressure when the engine is started and change over to high-pressure delivery during normal engine operation, in which the cost can be reduced by using a single solenoid valve to comprise the solenoid valve unit.

A further object of the first aspect of the invention is to provide a solenoid valve unit for a fuel injection apparatus in which the timing of signals sent to a solenoid valve can be simplified and the solenoid valve opened and closed with a small force, wherein once a control signal has been used to open the solenoid valve, the open state can be maintained when the valve is receiving fuel delivered under high pressure without having to continue to supply control signals.

Further second, third and fourth aspects of the invention are described following the description of thee embodiments relating to the above aspects of the invention.

SUMMARY OF THE INVENTION

For achieving the above objects, the first aspect of the invention provides a solenoid valve unit for a fuel injection apparatus, said the apparatus comprising a low-pressure pump that supplies fuel at low pressure from a fuel tank, a high-pressure pump that supplies the low-pressure fuel from the low-pressure pump to an injector that injects the fuel at high pressure into an engine the solenoid valve unit comprising, a housing provided with a high-pressure lead-in port from the injector, a low-pressure lead-out port to the fuel tank, a return port from the high-pressure pump, a high-pressure passage in communication with the lead-in port, a low-pressure passage in communication with the lead-out port, and a return port passage in communication with the return port, a pressure control valve that opens and closes the high-pressure passage and low-pressure passage in accordance with pressure at the lead-in port, and solenoid valves able to communicate with the lead-in port and lead-out port via the pressure control valve and able to open and close communication between the high-pressure passage and the low-pressure passage, and between the low-pressure passage and the return port passage, wherein the solenoid valves are controlled to open communication between the high-pressure passage and the low-pressure passage and close communication between the low-pressure passage and the return port passage during engine startup, and close communication between the high-pressure passage and the low-pressure passage, and open communication between the low-pressure passage and the return port passage during normal engine operation.

The above solenoid valve unit can be provided with a first solenoid valve that opens and closes communication between the high-pressure passage and the low-pressure passage and a second solenoid valve that opens and closes communication between the low-pressure passage and the return port passage.

In the above solenoid valve unit, moreover, after the engine is operating normally communication between the high-pressure passage and the low-pressure passage can be closed by setting the first solenoid valve off and communication between the low-pressure passage and the return port passage can be opened by setting the second solenoid valve to off. Also, after the engine is operating normally, communication between the high-pressure passage and the low-pressure passage is closed by setting the first solenoid valve to on and communication between the low-pressure passage and the return port passage is opened by setting the second solenoid valve to off.

The solenoid valve can use a single armature to drive a first valve element that opens and closes communication between the high-pressure passage and the low-pressure passage and a second valve element that opens and closes communication between the low-pressure passage and the return port passage. Also, after the engine is operating normally, communication between the high-pressure passage and the low-pressure passage can be closed and communication between the low-pressure passage and the return port passage opened by setting the solenoid valve to on.

In the solenoid valve unit for a fuel injection apparatus according to this first aspect of the invention, at the time of engine startup communication is opened between the low-pressure passage and high-pressure passage while at the same time closing communication between the low-pressure passage and the return port passage. There is therefore rise in the pressure acting on the pressure control valve on the high-pressure pump side, so there is no high-pressure delivery of fuel by the high-pressure pump, allowing fuel to be supplied at low pressure to the injector from the low-pressure pump. Furthermore, during normal engine operation communication between the high-pressure passage and the low-pressure passage is closed while at the same time communication is opened between the low-pressure passage and the return port passage, whereby the high-pressure pump pressure increases, enabling normal high-pressure fuel delivery to take place.

That is, the characteristic of the low-pressure pump is used, the fact that the delivery pressure is low but that the delivery flow amount is sufficient when starting the engine. When the engine is being started, a fuel supply circuit is switched to nullify the high-pressure pump or stop fuel pressurization by the pump, thereby allowing the fuel to be delivered to the injector using just the low-pressure pump, which can provide enough fuel for starting the engine. Thus, it becomes possible to suppress fuel vaporization during a hot restart and the like. After the engine has been started and is operating normally, a switchover by the solenoid valve enables normal high-pressure fuel delivery from the high-pressure pump to take place.

After the engine is operating normally, by setting the solenoid valve to on so that communication between the high-pressure passage and the low-pressure passage is closed, the solenoid valve is also subjected, via the pressure control valve, to the pressure of the fuel supplied under high-pressure from the high-pressure pump. As the communication between the high-pressure passage and low-pressure passage therefore remains closed even if the solenoid valve is set to off, control signals to the solenoid valve can be simplified. Also, as the solenoid does not have to be energized as long as exposure to the high-pressure fuel continues, it is possible to employ a less powerful solenoid valve.

Using a single armature to drive both a first valve element that opens and closes communication between the high-pressure passage and the low-pressure passage and a second valve element that opens and closes communication between the low-pressure passage and the return port passage, makes it possible to effect the above control with a single solenoid valve. This can contribute to reducing the size, complexity and cost of the structure.

The above and other features of the present invention will become apparent from the following description made with reference to the drawings.

BRIEF DESCRIPTION OF THE DRAWINGS

FIG. 6 is a chart showing the operating states of the various elements of the above solenoid valve unit.

DESCRIPTION OF THE PREFERRED EMBODIMENTS

Figure 1:
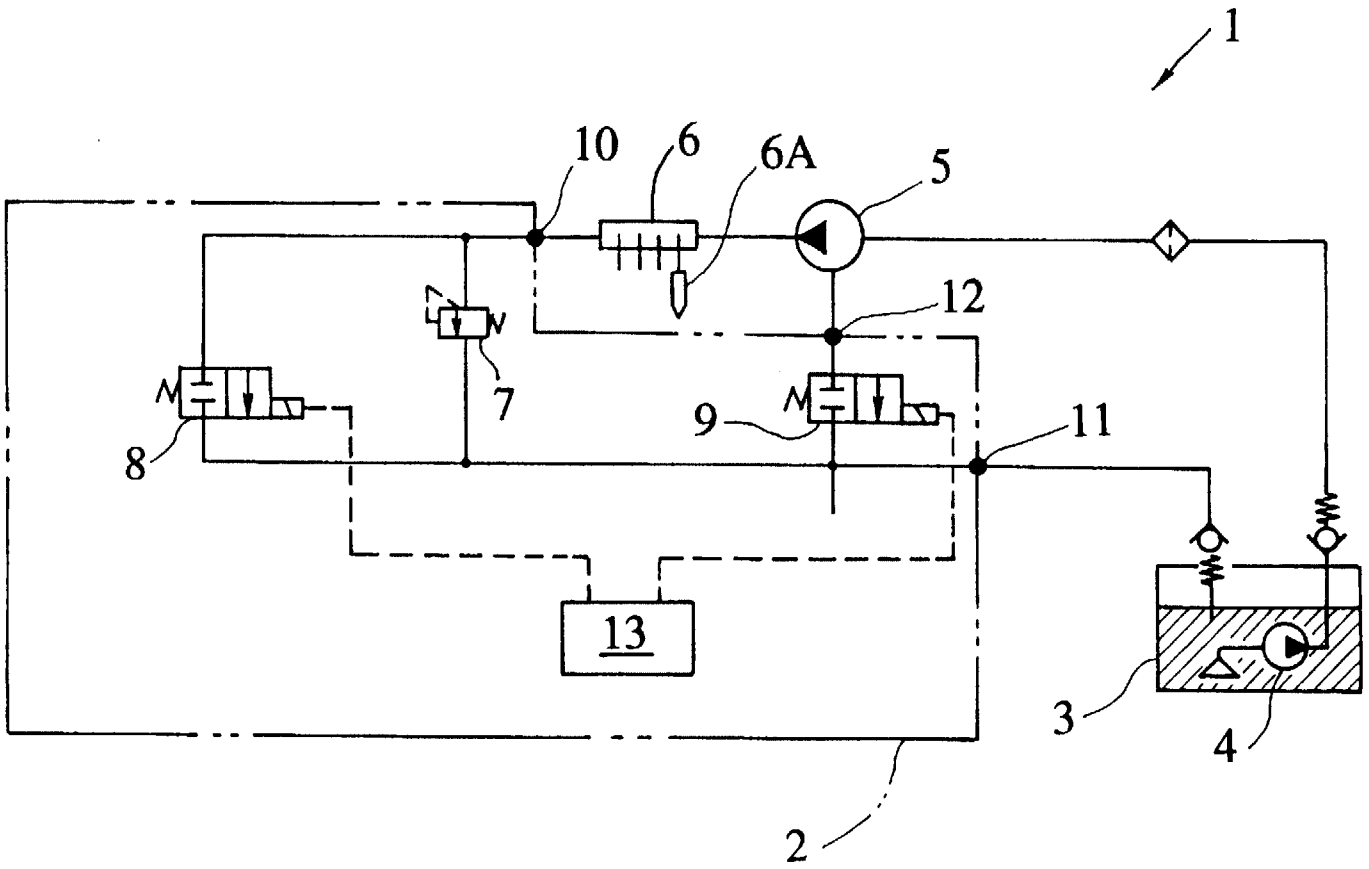
FIG. 1 is a schematic diagram of a fuel injection apparatus 1 equipped with a solenoid valve unit 2 in a first embodiment according to the first aspect of the invention.

A first embodiment of the solenoid valve unit for a fuel injection apparatus according to the first aspect of the invention will now be described with reference to FIGS. 1 to 4. FIG. 1 is a schematic diagram of a solenoid valve unit 2 for a fuel injection apparatus 1, in which he fuel injection apparatus 1 is provided with a fuel tank 3, a low-pressure feed pump (low-pressure pump) 4, a high-pressure gasoline pump (high-pressure pump) 5, a common rail (accumulator) 6, an injector 6A and the solenoid valve unit 2.

The low-pressure pump 4 is electrically driven and therefore does not depend on the speed (revolutions per minute) of the engine (not shown). The delivery flow amount of the low-pressure pump 4 is therefore constant, regardless of the engine speed. The driving of the high-pressure pump 5 is related to the engine, so an amount of fuel corresponding to the engine speed can be fed under high pressure to the common rail 6, and therefore to the injector 6A.

The solenoid valve unit 2 is provided with a high-pressure control valve 7, a first solenoid valve 8 and a second solenoid valve 9. The high-pressure control valve 7 and the first solenoid valve 8 are connected in parallel between a high-pressure lead-in port 10 and a low-pressure lead-out port 11 of the high-pressure control valve 7. Also, the high-pressure control valve 7 and the second solenoid valve 9 are connected in parallel between the high-pressure pump 5 and the low-pressure lead-out port 11. A return port 12 from the high-pressure pump 5 is connected to the second solenoid valve 9. The solenoid valve unit 2 is also provided with a control circuit 13 for the first solenoid valve 8 and second solenoid valve 9.

Figure 2:
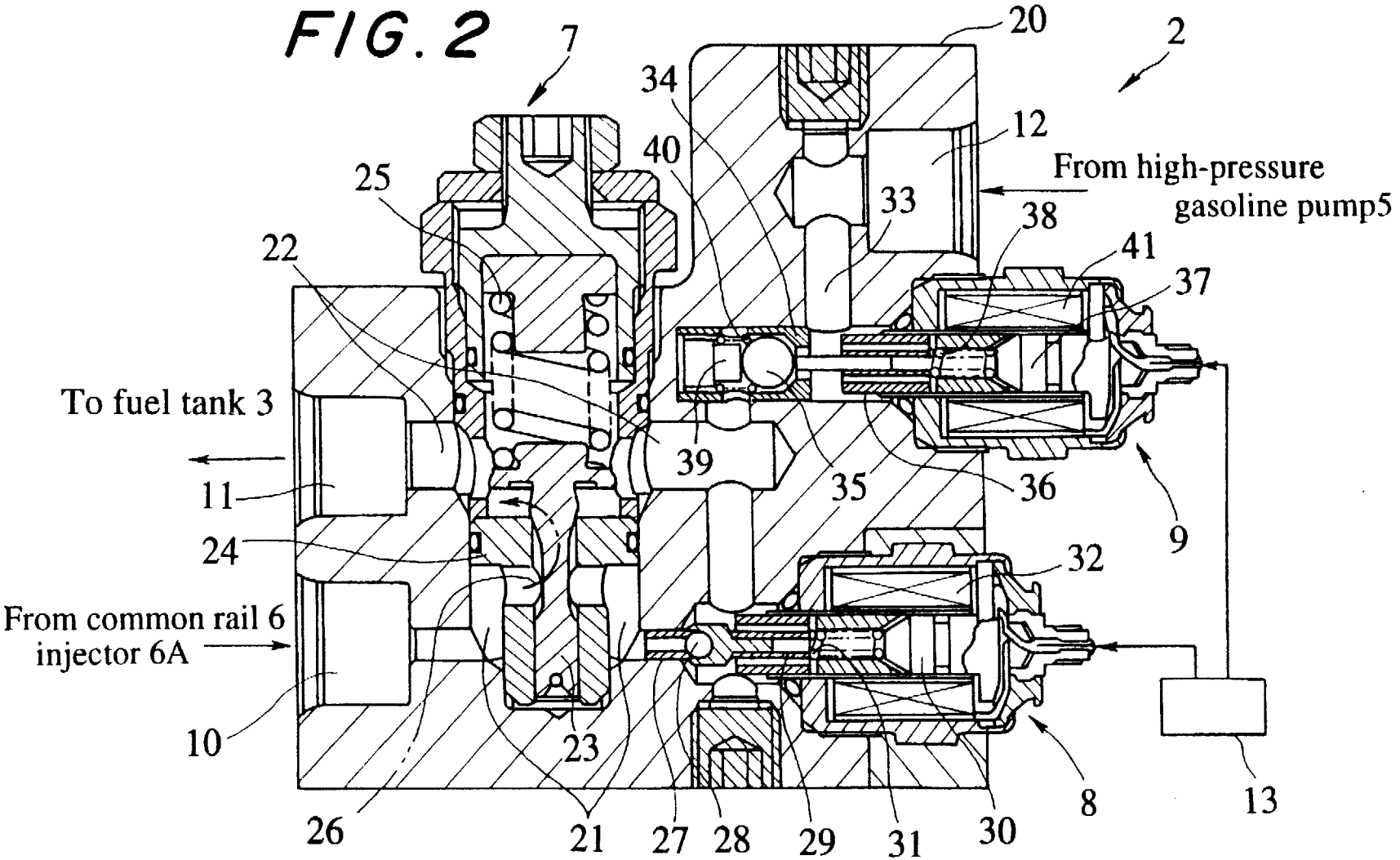
FIG. 2 is a sectional view of the above solenoid valve unit 2.

FIG. 2 is a partial sectional view of the solenoid valve unit 2. The high-pressure control valve 7, first solenoid valve 8 and second solenoid valve 9 of the solenoid valve unit 2 are arranged in a valve unit housing 20. The high-pressure lead-in port 10, low-pressure lead-out port 11 and return port 12 are formed in the housing 20. The high-pressure control valve 7 intersects a high-pressure passage 21 that communicates with the high-pressure lead-in port 10 and a low-pressure passage 22 that communicates with the low-pressure lead-out port 11. A pressure control valve element 23 seats on a valve seat member 24. The high-pressure passage 21 and low-pressure passage 22 are maintained in a closed state by a control spring 25 urging the valve element 23 closed.

When the pressure from the high-pressure lead-in port 10 becomes excessively high, the valve element 23 is lifted off the valve seat member 24 against the resistance of the spring 25, the gap between the valve element 23 and valve seat member 24 thus forming a passage 26 (indicated in the drawing by a phantom line) between the high-pressure passage 21 and low-pressure passage 22. The high-pressure control valve 7 may also be constituted as a spool type valve.

The first solenoid valve 8 is able to communicate with the high-pressure lead-in port 10 and low-pressure lead-out port 11 via the high-pressure control valve 7. For this, a valve element 28 that seats on a valve seat member 27 between the high-pressure passage 21 and the low-pressure passage 22 is normally urged onto the valve seat member 27 by a solenoid spring 31 provided between an armature 29 integrated with the valve element 28 and a spring seat member 30. Energizing a solenoid 32 by a signal from the control circuit 13 causes the armature 29 to be drawn in against the resistance of the solenoid spring 31, lifting the valve element 28 from the valve seat member 27 and opening communication between the high-pressure passage 21 and the low-pressure passage 22. When the pressure from high-pressure lead-in port 10 has reached a sufficiently high level, the state of open communication is maintained.

The second solenoid valve 9 is able to communicate with the high-pressure lead-in port 10 and low-pressure lead-out port 11 via the high-pressure control valve 7. For this, there is a valve element 35 that seats on a valve seat member 34 located between the low-pressure passage 22 and a return port passage 33 that communicates with the return port 12. Provided between an armature 36 integrated with the valve element 35 and a spring seat member 37 is a solenoid spring 38, and there is also a valve spring 40 between the valve element 35 and a spring seat member 39. The force of the spring 38 urges the valve element 35 towards the valve seat member 34, opening a space between the valve element 35 and the valve seat member 34 that allows communication between the low-pressure passage 22 and the return port passage 33. By energizing a solenoid 41 with a signal from the control circuit 13, the armature 36 is drawn in against the resistance of the solenoid spring 38, seating the valve element 35 on the seat 34 thereby closing communication between the low-pressure passage 22 and the return port passage 33.

Figures 3, 4:
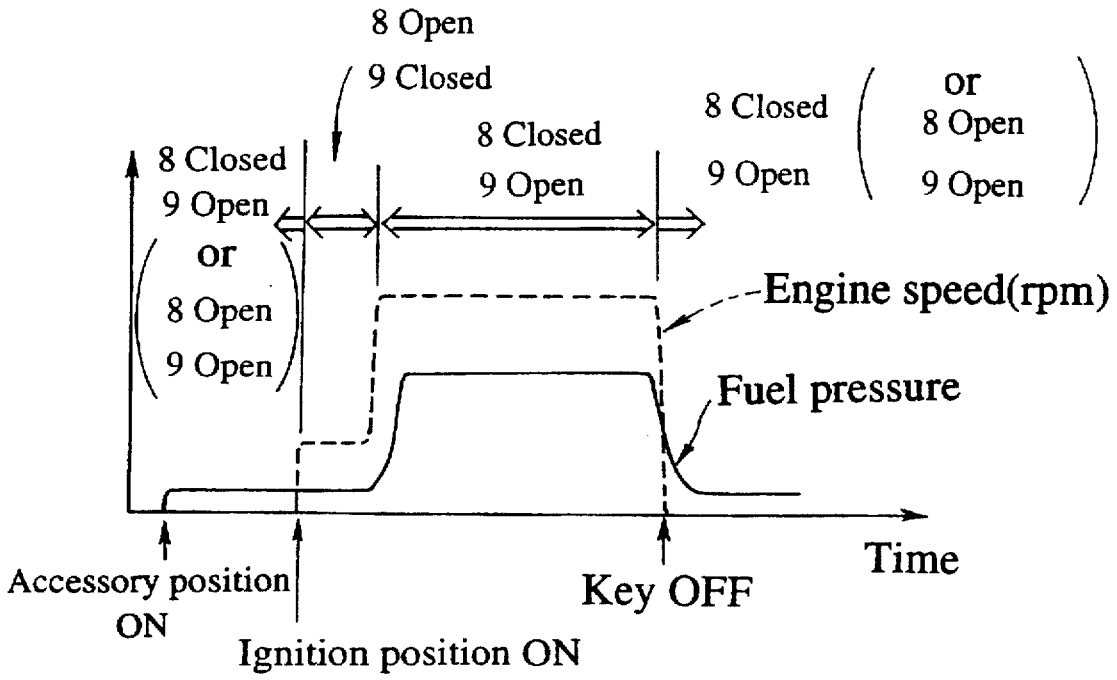
FIG. 3 is a chart showing the operating states of the various elements of the solenoid valve unit.
FIG. 4 is a graph showing the relationship between engine speed and the pressure of fuel to the injector 6A.

The operating states of the elements in the solenoid valve unit 2 thus configured is shown in FIG. 3, and will now be described, with reference also to the graph of FIG. 4 showing the relationship between engine speed and fuel pressure. Setting the first solenoid valve 8 on during engine startup causes the valve element 28 to be lifted from the valve seat member 27. This opens the high-pressure passage 21, opening communication between the high-pressure passage 21 and the low-pressure passage 22. By also setting the second solenoid valve 9 to on, the valve element 35 is seated on valve seat member 34, closing the return port passage 33, thereby closing communication between the low-pressure passage 22 and the return port passage 33.

With communication thus opened between the high-pressure passage 21 and the low-pressure passage 22 by the first solenoid valve 8, there is no rise in pressure in the passage 21 and fuel pressure at the injector 6A is low, making it possible to start the engine with the low pressure fuel delivery of the low-pressure pump 4. Also, with communication thus closed between the low-pressure passage 22 and the return port passage 33 by the second solenoid valve 9, there is a large flow of low-pressure fuel in the fuel piping, delivered at a constant rate from the low-pressure pump 4, that fills the piping, suppressing fuel vaporization. The cooling and lubrication of the high-pressure pump 5 are effected by the large flow of fuel from the low-pressure pump 4.

Reverting to FIG. 3, once the engine is running normally the first solenoid valve 8 can be switched off, which closes communication between high-pressure passage 21 and low-pressure passage 22 by seating the valve element 28 on the valve seat member 27. As a result, high pressure is produced in the high-pressure passage 21 and at the injector 6A, and high-pressure injection is carried out using the high-pressure pump 5. When the second solenoid valve 9 is switched off the valve element 35 is lifted off the valve seat member 34, which opens communication between the low-pressure passage 22 and the return port passage 33, allowing normal cooling and lubrication of the high-pressure pump 5

With respect to changes over time in the pressure of fuel going to the injector 6A and the engine speed, as shown in FIG. 4, when the key is turned to the accessory on position (not shown), the low-pressure pump 4 is activated, raising the fuel pressure. The engine is cranked by turning the key further, to the ignition on position (not shown). Until the key is turned to the ignition on position, the first solenoid valve 8 is closed and the second solenoid valve 9 is open, or the first solenoid valve 8 and second solenoid valve 9 are both open, and when the ignition is switched on, as described above, the first solenoid valve 8 is opened and the second solenoid valve 9 is closed, and the engine is started using low-pressure fuel delivery by the low-pressure pump 4.

After the engine is fully operational, engine speed is increased by closing the first solenoid valve 8 and opening the second solenoid valve 9, whereby fuel pressure rises for normal operation under high-pressure fuel delivery. When the key is turned to the off position, the first solenoid valve 8 closes and the second solenoid valve 9 opens, or valves 8 and 9 are both opened. As the first solenoid valve 8 is configured as a high-pressure opposition type valve, meaning it has to be held closed against pressure from the high-pressure passage 21, it is necessary to use a powerful solenoid 32.

Figure 5:
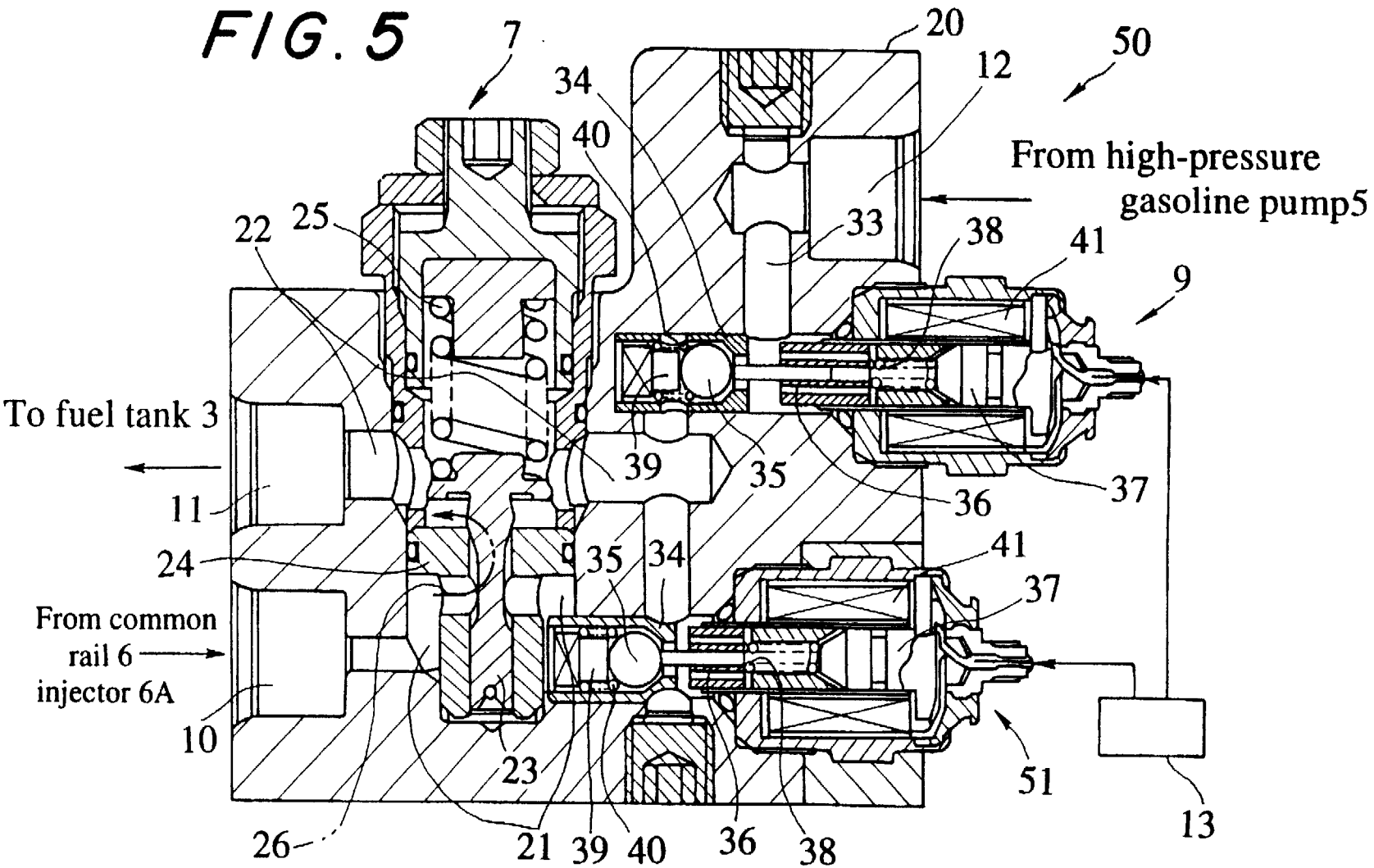
FIG. 5 is a sectional view of a solenoid valve unit 50 in a second embodiment according to the first aspect of the invention.

A second embodiment of the solenoid valve unit according to the first aspect of the invention will now be described with reference to FIGS. 5 and 6. FIG. 5 is a sectional view of a solenoid valve unit 50 of the second embodiment. The difference between the solenoid valve unit 50 and solenoid valve unit 2 is that instead of the first solenoid valve 8, the solenoid valve unit 50 has a first solenoid valve 51 having the same configuration as the second solenoid valve 9. Parts of the 51 have therefore been given the same reference numerals as those of the second solenoid valve 9, and further explanation thereof is omitted.

Setting the first solenoid valve 51 off during engine startup causes the valve element 35 to be lifted from the valve seat member 34, opening first solenoid valve 51. This opens the high-pressure passage 21, that is, communication is opened between high-pressure passage 21 and low-pressure passage 22. The second solenoid valve 9 is also set to on, which seats the valve element 35 on the valve seat member 34, closing the second solenoid valve 9 and thereby the return port passage 33, meaning that communication between the low-pressure passage 22 and the return port passage 33 is closed. As the first solenoid valve 51 is open, the engine can be started using the low-pressure fuel delivery of the low-pressure pump 4, without using the high-pressure pump 5.

Reverting to FIG. 6, once the engine is operating normally, the first solenoid valve 51 is closed by switching it on, closing high-pressure passage 21 and the second solenoid valve 9 is opened by switching it off, opening return port passage 33, resulting in high-pressure fuel injection by the high-pressure pump 5.

The first solenoid valve 51 is a high-pressure action type. Therefore, once the engine is operating normally under high-pressure fuel injection, even if the first solenoid valve 51 is switched off, because the fuel pressure from the high-pressure lead-in port 10 is sufficiently high, the valve element 35 remains seated on the valve seat member 34 against the resistance of the solenoid spring 38, maintaining the closed state of the high-pressure passage 21. This allows fuel to be delivered under high pressure by the high-pressure pump 5 and also improves the high-pressure retention characteristics. This simplifies control signals to the solenoid 41 of the first solenoid valve 51. Compared with the first solenoid valve 8, another improvement is that a less powerful solenoid 41 can be used.

After the engine has been stopped, the first solenoid valve 51 is switched off, reopening high-pressure passage 21, and the second solenoid valve 9 is switched off, opening return port passage 33. The solenoid valve unit 2 of the first embodiment and the solenoid valve unit 50 of the second embodiment both require a first solenoid valve 8 or 51 and a second solenoid valve 9, but the solenoid valve unit according to this first aspect of the invention can also be configured using a single solenoid valve.

Figure 7:
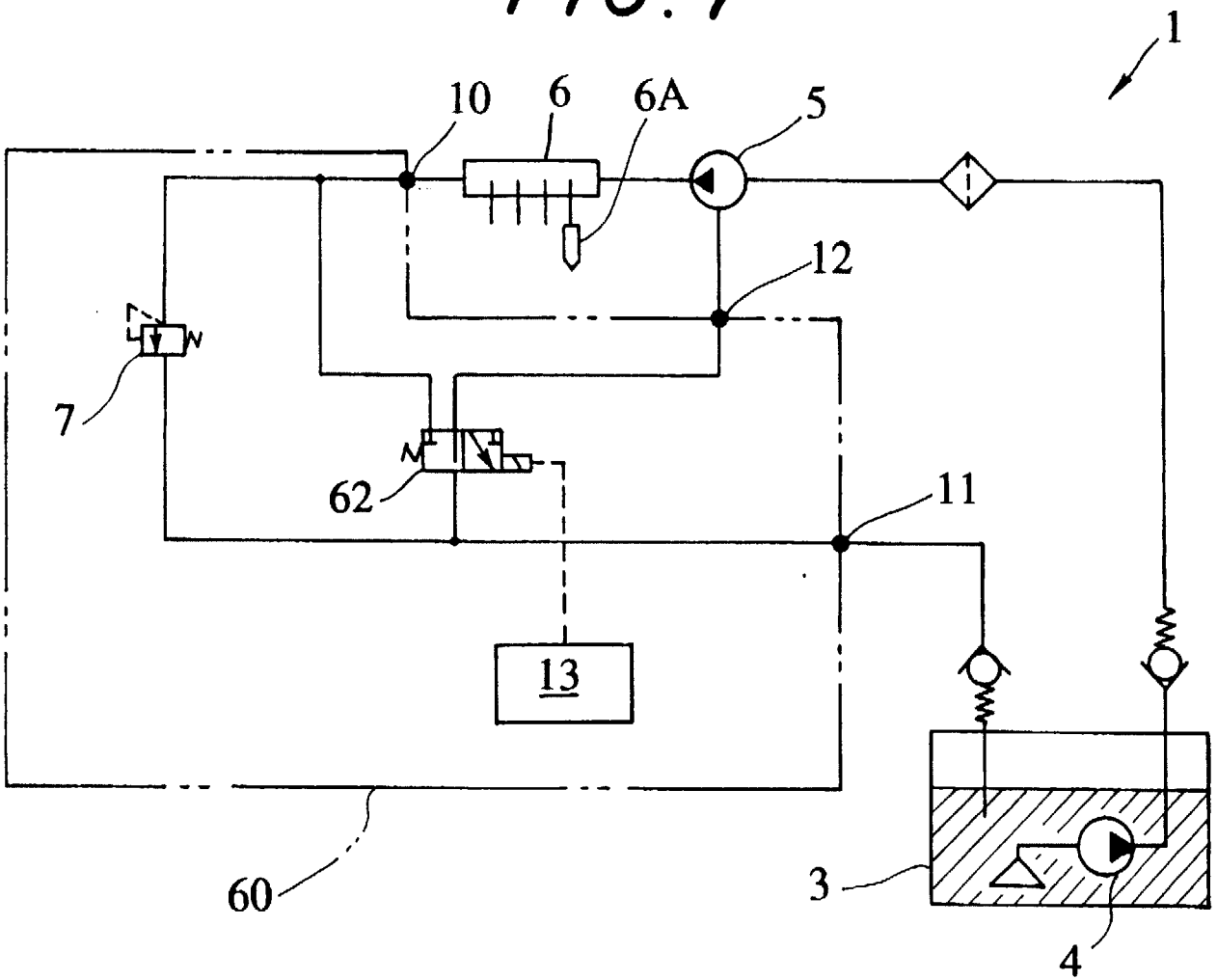
FIG. 7 is a schematic diagram of a fuel injection apparatus equipped with a solenoid valve unit 60 in a third embodiment according to the first aspect of the invention.
Figure 8:
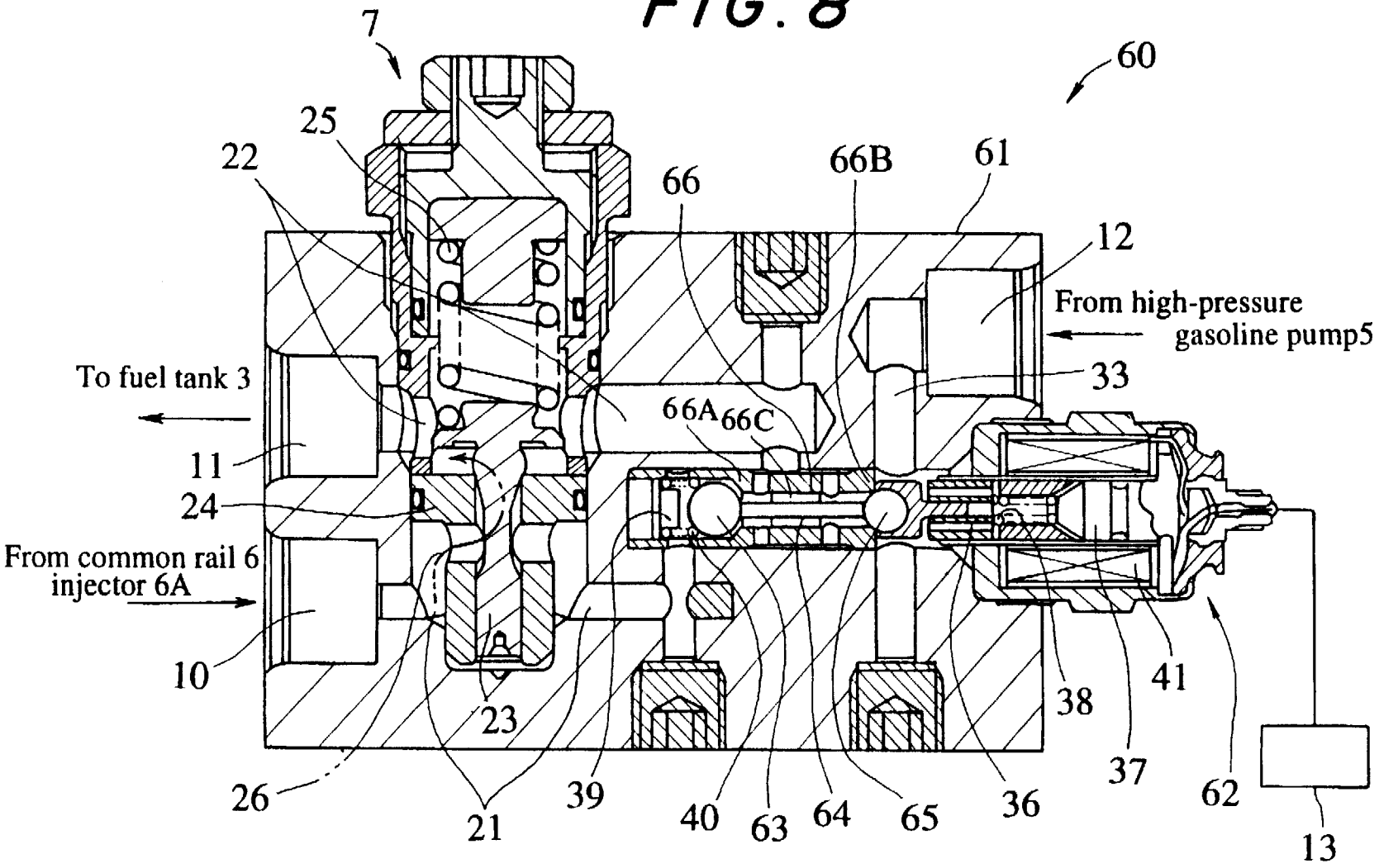
FIG. 8 is a sectional view of the above solenoid valve unit 60 that uses a single solenoid valve 62.

A third embodiment of the first aspect of the invention that uses a single solenoid valve will now be described with reference to FIGS. 7 to 10. FIG. 7 is a schematic diagram of a fuel injection apparatus 1 equipped with a solenoid valve unit 60 according to the third embodiment of the invention, and FIG. 8 is a sectional view of the solenoid valve unit 60. With reference to the drawings, in addition to the solenoid valve unit 60, the fuel injection apparatus 1 is provided with a fuel tank 3, low-pressure pump 4, high-pressure pump 5, common rail 6, injector 6A and high-pressure control valve 7.

A high-pressure control valve 7 and a single solenoid valve 62 are provided in a housing 61 of the solenoid valve unit 60. The housing 61 also has a high-pressure lead-in port 10, a low-pressure lead-out port 11, a return port 12, and a solenoid valve 62 control circuit 13. The high-pressure control valve 7 and the solenoid valve 62 are connected in parallel between the high-pressure lead-in port 10 and the low-pressure lead-out port 11, and the return port 12 from the high-pressure pump 5 is connected to the solenoid valve 62. The solenoid valve 62 straddles high-pressure passage 21, low-pressure passage 22 and return port passage 33, and is provided with an armature 36, a spring seat member 37, solenoid spring 38, spring seat member 39, valve spring 40, solenoid 41, first valve element 63, connecting rod 64, second valve element 65 and a valve seat member 66.

The first valve element 63, connecting rod 64 and second valve element 65 are integrated with the armature 36. The first valve element 63 seats on a first seat face 66A of the valve seat member 66, and the second valve element 65 seats on a second seat face 66B. A connecting passage 66C is formed in the valve seat member 66 that is able to provide communication between the high-pressure passage 21 and low-pressure passage 22, and between the return port passage 33 and low-pressure passage 22.

Figures 9, 10:
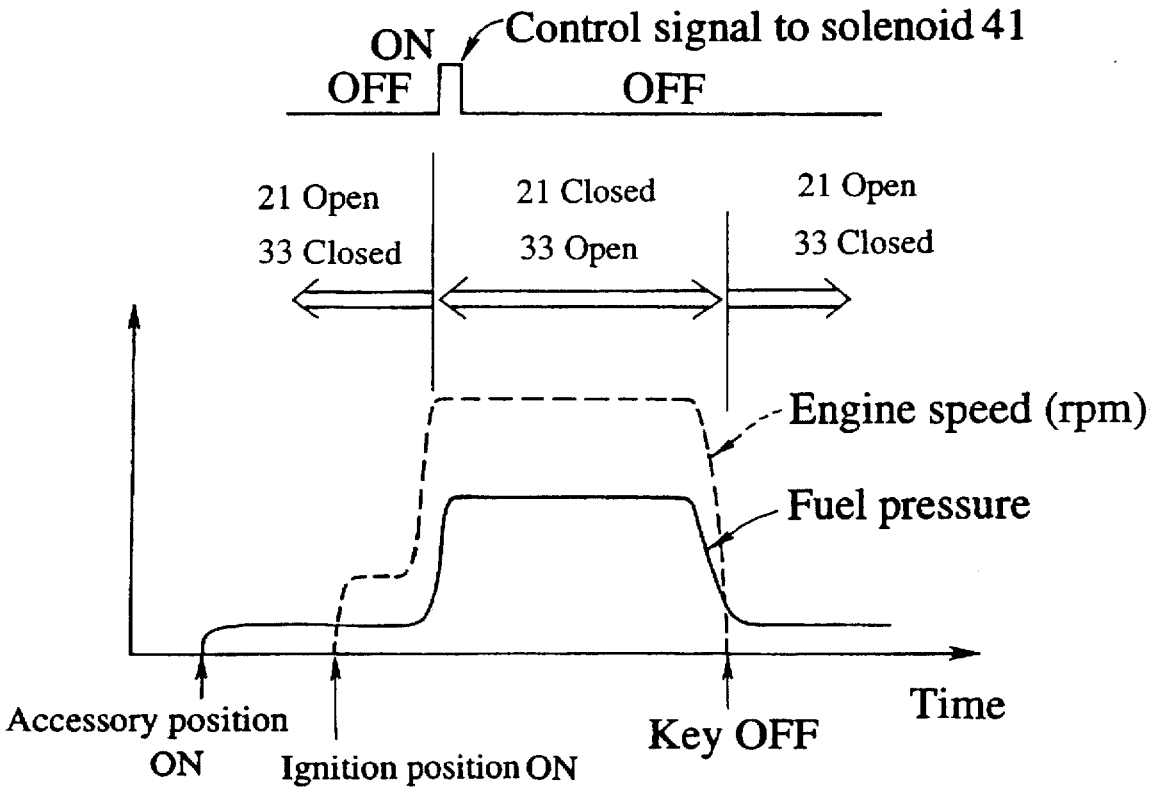
FIG. 9 is a chart showing the operating states of the various elements of the above solenoid valve unit.
FIG. 10 is a graph showing the relationship between engine speed and the pressure of fuel to the injector 6A.

The operating states of the elements in the solenoid valve 62 thus configured is shown in FIG. 9, and will now be described, with reference also to the graph of FIG. 10 showing the relationship between engine speed and fuel pressure. Setting the solenoid valve 62 off during engine startup causes the first valve element 63 to be lifted from the seat face 66A. This opens the high-pressure passage 21, opening communication between the high-pressure passage 21 and the low-pressure passage 22, and seats the second valve element 65 on the second seat face 66B, closing the return port passage 33, thereby closing communication between the return port passage 33 and the low-pressure passage 22.

With communication thus opened between the high-pressure passage 21 and the low-pressure passage 22, there is no rise in pressure in the passage 21, so fuel pressure at the common rail 6 and injector 6A is low, making it possible to start the engine with the low pressure fuel delivery provided by low-pressure pump 4. Reverting to FIG. 9, once the engine has been started and is running normally under high-pressure fuel injection, the solenoid valve 62 is switched on to close communication between the high-pressure passage 21 and low-pressure passage 22 by seating the valve element 63 on the seat face 66A. Also, the second valve element 65 is lifted from the second seat face 66B, opening communication between return port passage 33 and low-pressure passage 22, and with communication between high-pressure passage 21 and low-pressure passage 22 being closed, high pressure is produced in the high-pressure passage 21 and at the injector 6A, and high-pressure injection by the high-pressure pump 5 takes place.

With respect to the pressure of fuel supplied to the common rail 6 and injector 6A and the engine speed, as shown in FIG. 10, when the key is turned to the accessory on position (not shown), the low-pressure pump 4 is activated, raising the fuel pressure. The engine is cranked by turning the key further, to the ignition on position (not shown). Until the key is turned to the ignition on position, communication between the high-pressure passage 21 and the low-pressure passage 22 is open and communication between the return port passage 33 and low-pressure passage 22 is closed. Turning the key to the ignition on position causes the engine to be started with the low-pressure fuel delivery by the low-pressure pump 4.

As described above, communication can be closed between the high-pressure passage 21 and low-pressure passage 22 and opened between the return port passage 33 and low-pressure passage 22 by setting the solenoid valve 62 on, and as the solenoid valve 62 is a high-pressure action type, even if the solenoid valve 62 is switched off, the closed communication between the high-pressure passage 21 and low-pressure passage 22 and the open communication between the return port passage 33 and the low-pressure passage 22 can be maintained, making it possible to simplify control signals to the solenoid 41 (see the control signal to the solenoid 41 in FIG. 10) and to shorten the time electrical power is applied to the solenoid 41. After the low-pressure start, closing communication between the high-pressure passage 21 and the low-pressure passage 22 and opening communication between the return port passage 33 and the low-pressure passage 22 increases the engine speed and fuel pressure, for normal engine operation by high-pressure fuel injection. When the key is turned to the off position, communication is opened between high-pressure passage 21 and low-pressure passage 22 and closed between return port passage 33 and low-pressure passage 22.

With the solenoid valve unit 60 thus configured, communication between low-pressure passage 21 and return port passage 33 can be opened and closed by means of a single solenoid valve 62 (single solenoid 41), which contributes to reducing the cost.

After the engine has been started and is operating normally with high-pressure fuel injection, even if the first solenoid valve 62 is switched off, because the fuel pressure from the high-pressure lead-in port 10 is sufficiently high (the solenoid valve 62 being configured as a high-pressure action type in which the high-pressure fuel acts in the direction in which the first valve element 63 is seated), the first valve element 63 remains seated on the first seat face 66A against the resistance of the solenoid spring 38, so communication between the high-pressure passage 21 and the low-pressure passage 22 remains closed. This allows fuel to be delivered under high pressure by the high-pressure pump 5 and also improves the high-pressure retention characteristics. It is therefore possible to simplify control signals to the solenoid 41 (see the control signal to the solenoid 41 in FIG. 10) and to shorten the time electrical power is applied to the solenoid 41, and a less powerful solenoid 41 can be used.

After the engine has been stopped, as shown in FIG. 9, communication can be opened between high-pressure passage 21 and low-pressure passage 22 and closed between return port passage 33 and low-pressure passage 22 by switching off the solenoid valve 62. That is, once the engine has been operating under high-pressure fuel injection, the fuel pressure cannot be lowered until the engine has been stopped. Therefore, with communication remaining closed between the high-pressure passage 21 and low-pressure passage 22 and communication remaining open between the return port passage 33 and low-pressure passage 22, when during transmission (not shown) changes or the like the engine speed is reduced without being able to change over from the high-pressure pump 5 to the low-pressure pump 4, the delivery amount of the high-pressure pump 5 decreases, and can result in engine stoppage.

Thus, what is desirable is to be able to ensure a prescribed low-pressure flow amount by the low-pressure pump 4 after the engine has been started and is running at a very low speed, and the ability, even during normal engine operation, to change between high-pressure and low-pressure fuel injection modes in accordance with engine running requirements. Furthermore, the solenoid valve unit 60 requires a high-pressure control valve 7 and a separate high-pressure changeover solenoid valve 62, which makes it difficult to reduce the cost of the parts, the overall size and the number of assembly steps, and also makes it difficult to improve the reliability.

These problems and matters are addressed by second, third and fourth aspects of the invention, the object of which also is to provide a solenoid valve unit for a fuel injection apparatus that suppresses fuel vaporization when an engine is subjected to a hot restart and reliably improve engine operation, by providing a stable fuel delivery when the engine is started.

A further object of the second, third and fourth aspects of the invention is to provide a solenoid valve unit for a fuel injection apparatus that can pump fuel at low pressure when the engine is started and change over to high-pressure delivery during normal engine operation.

A further object of the second, third and fourth aspects of the invention is to provide a solenoid valve unit for a fuel injection apparatus that can pump fuel at low pressure when the engine is started and change over to high-pressure delivery during normal engine operation, in which the cost can be reduced by using a single solenoid valve to comprise the solenoid valve unit.

Moreover, while the first three embodiments according to the first aspect of the invention are also directed at resolving the difficulty, during a hot restart, of eliminating air, insufficiency of the fuel injection amount when the engine is being started or is operating at very low speeds, pressure instability of high-pressure fuel delivery and other such problems, the following embodiments according to the second, third and fourth aspects of the invention provide a further improvement to resolve such problems. To achieve this object, a solenoid valve unit for a fuel injection apparatus is provided that uses a magnetic valve (on/off valve) to ensure a prescribed low-pressure fuel delivery by a low-pressure feed pump after the engine has been started and is running at very low speed, and is able, even during normal engine operation, to change between high-pressure and low-pressure fuel injection modes in accordance with engine running requirements.

A further object of the second, third and fourth aspects of the invention is to provide a solenoid valve unit for a fuel injection apparatus in which the solenoid valve unit is a high-pressure opposition type in which the direction in which the solenoid valve element is seated is opposite to the direction of high-pressure fuel delivery, enabling simplification of solenoid valve control signals.

A further object of the second, third and fourth aspects of the invention is to provide a solenoid valve unit for a fuel injection apparatus in which the high-pressure control valve and the high-low pressure changeover solenoid valve are integrated to simplify the solenoid valve unit and reduce the cost.

For achieving the above objects, the second aspect of the invention provides a fuel injection apparatus, including solenoid valve unit for a fuel injection apparatus, the apparatus comprising a low-pressure pump that supplies fuel at low pressure from a fuel tank, a high-pressure pump that supplies the low-pressure fuel from the low-pressure pump to an injector that injects the fuel at high pressure into an engine the solenoid valve unit comprising, a unit housing provided with a high-pressure lead-in port from the injector, a low-pressure lead-out port to the fuel tank, a high-pressure passage in communication with the lead-in port, and a low-pressure passage in communication with the lead-out port, a high-pressure control valve that opens and closes the high-pressure passage and low-pressure passage in accordance with pressure at the lead-in port, a solenoid valve that is able to communicate with the lead-in port and lead-out port via the high-pressure control valve and can open and close communication between the high-pressure passage and the low-pressure passage, a check valve arranged between the low-pressure passage and the fuel tank, and a low-pressure control valve arranged between the high-pressure pump and the fuel tank, wherein an opening pressure of the low-pressure control valve is set at a higher pressure than the opening pressure of the check valve and the solenoid valve is controlled to open communication between the high-pressure passage and the low-pressure passage during engine startup, and to close communication between the high-pressure passage and the low-pressure passage during normal engine operation.

The above objects are also achieved by a solenoid valve unit for a fuel injection apparatus according to the third aspect of the invention, wherein, instead of the check valve used in the second aspect of the invention, an orifice is formed in the high-pressure passage to set the pressure therein. The apparatus comprises a low-pressure pump that supplies fuel at low pressure from a fuel tank, a high-pressure pump that supplies the low-pressure fuel from the low-pressure pump to an injector that injects the fuel at high pressure into an engine. The solenoid valve unit comprises a unit housing provided with a high-pressure lead-in port from the injector, a low-pressure lead-out port to the fuel tank, a high-pressure passage in communication with the lead-in port, and a low-pressure passage in communication with the lead-out port, said high-pressure passage having an orifice formed therein, a high-pressure control valve that opens and closes the high-pressure passage and low-pressure passage in accordance with pressure at the lead-in port, a solenoid valve that is able to communicate with the lead-in port and lead-out port via the high-pressure control valve and can open and close communication between the high-pressure passage and the low-pressure passage, and a low-pressure control valve arranged between the high-pressure pump and the fuel tank, wherein the orifice in the high-pressure passage is of a diameter that allows the valve opening pressure of the low-pressure control valve to be set at a higher pressure than the pressure in the high-pressure passage when the solenoid valve is set at open and the solenoid valve is controlled to open communication between the high-pressure passage and the low-pressure passage during engine startup, and to close communication between the high-pressure passage and the low-pressure passage during normal engine operation.

In a solenoid valve unit for a fuel injection apparatus according to the fourth aspect of the invention, a high-pressure control valve and a solenoid valve for switching high and low pressure are integrated. The apparatus comprises a low-pressure pump that supplies fuel at low pressure from a fuel tank, a high-pressure pump that supplies the low-pressure fuel from the low-pressure pump to an injector that injects the fuel at high pressure into an engine. The solenoid valve unit comprises a unit housing provided with a high-pressure lead-in port from the injector, a low-pressure lead-out port to the fuel tank, a high-pressure passage in communication with the lead-in port, and a low-pressure passage in communication with the lead-out port, a high-pressure control valve that opens and closes the high-pressure passage and low-pressure passage in accordance with pressure at the lead-in port, and a solenoid valve that can open and close communication between the high-pressure passage and the low-pressure passage, wherein the solenoid valve and the high-pressure control valve are integrated by making common use of a valve element thereof.

The above high-pressure control valve, solenoid valves, check valve and orifice can be formed in a single unit housing. A damper portion can be formed on the low-pressure side or the high-pressure side of the high-pressure control valve, and the solenoid valve and pressure control valve element can be configured as flat plate shaped bodies.

In the solenoid valve units according to the second, third and fourth aspects of the invention, at the time of engine startup communication is opened between the low-pressure passage and high-pressure passage, as in the first aspect of the invention. There is therefore no rise in the pressure acting on the pressure control valve on the high-pressure pump side, so there is no high-pressure delivery of fuel by the high-pressure pump, allowing fuel to be supplied at low pressure to the common rail and injector by the low-pressure pump. Communication between the high-pressure passage and the low-pressure passage is closed during normal engine operation, enabling normal high-pressure fuel delivery to take place.

Thus, the characteristic of the low-pressure pump is used, the fact that the delivery pressure is low but that the delivery flow amount is sufficient when starting the engine. When the engine is being started, a fuel supply circuit is switched to nullify the high-pressure pump or stop fuel pressurization by the pump, thereby allowing the fuel to be delivered to the injector using just the low-pressure pump, which can provide enough fuel for starting the engine. Thus, it becomes possible to suppress fuel vaporization during a hot restart and the like. After the engine is firing fully after startup, a switchover by the solenoid valve enables normal high-pressure fuel delivery from the high-pressure pump to take place.

In the case of the arrangement according to the second aspect of the invention using a check valve, as the opening pressure of the low-pressure control valve of the high-pressure pump is set at a higher pressure than the check valve opening pressure, the above-described effects can be realized when the engine is being started and at very low engine speeds. During normal engine operation, also, by switching the solenoid on and off in accordance with the engine operating status, the check valve, i.e. the solenoid valve, can be opened and shut while the low-pressure control valve remains closed, enabling the low-pressure pump to deliver the required amount during low speed operation without stopping the engine, thus realizing a stable supply of fuel.

In the case of the arrangement according to the third aspect of the invention that instead of the check valve of the second aspect of the invention uses an orifice formed in the high-pressure passage, the size of the orifice can be set at a desired diameter whereby when the solenoid valve is open (on), the opening pressure of the low-pressure control valve is higher than the high-pressure passage pressure, thereby providing the same effect as the check valve arrangement according to the second aspect of the invention.

The configuration according to the fourth aspect of the invention in which the high-pressure control valve and solenoid valve are integrated enables switching between low pressure and high pressure to be effected by the operation of a single valve element reducing the cost and size of the arrangement and improving the reliability.

Figure 11:
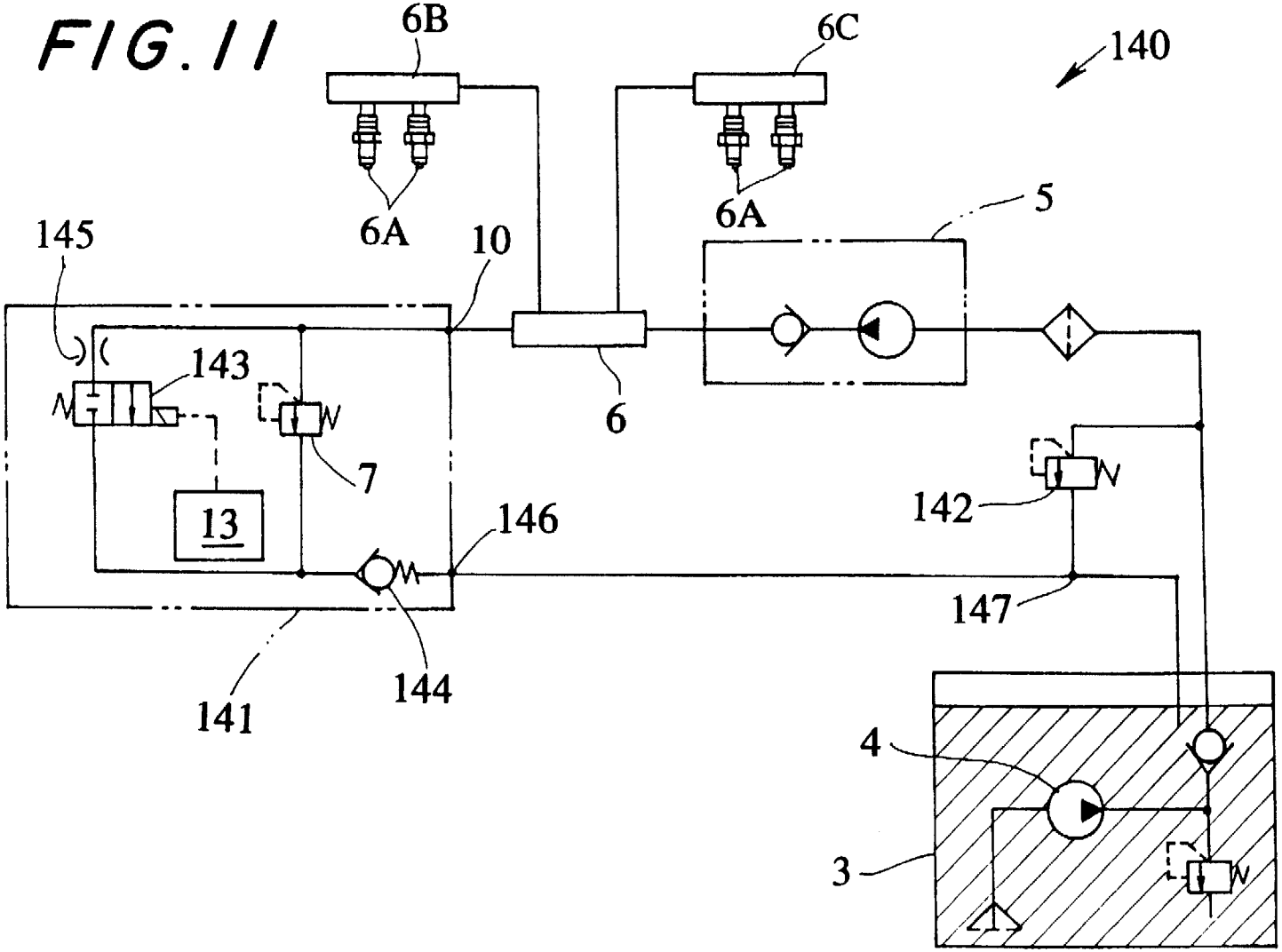
FIG. 11 is a schematic diagram of a fuel injection apparatus 140 equipped with a solenoid valve unit 141 in a fourth embodiment according to the second aspect of the invention.

A fourth embodiment of the solenoid valve unit for a fuel injection apparatus according to the second aspect of the invention will now be described with reference to FIGS. 11 to 14. Parts that are the same as those used in FIGS. 1 to 10 have been given the same reference numerals, further explanation thereof is omitted. FIG. 11 is a schematic diagram of a solenoid valve unit 141 of a fuel injection apparatus 140. In addition to the solenoid valve unit 141, the fuel injection apparatus 140 is provided with a fuel tank 3, low-pressure pump 4, high-pressure pump 5, low-pressure control valve 142 for the high-pressure pump 5, common rail 6 and injector 6A. The common rail 6 is connected to the injector 6A via a first bank rail 6B and second bank rail 6C having a smaller capacity.

The solenoid valve unit 141 is provided with a solenoid valve 143 having an orifice 145, the high-pressure control valve 7, a check valve 144, and a return connection point 147 from the check valve 144 via a low-pressure lead-out port 146. The high-pressure control valve 7 and solenoid valve 143 are provided in parallel between the high-pressure lead-in port 10 and the low-pressure lead-out port 146, and the check valve 144 in series.

Figure 12:
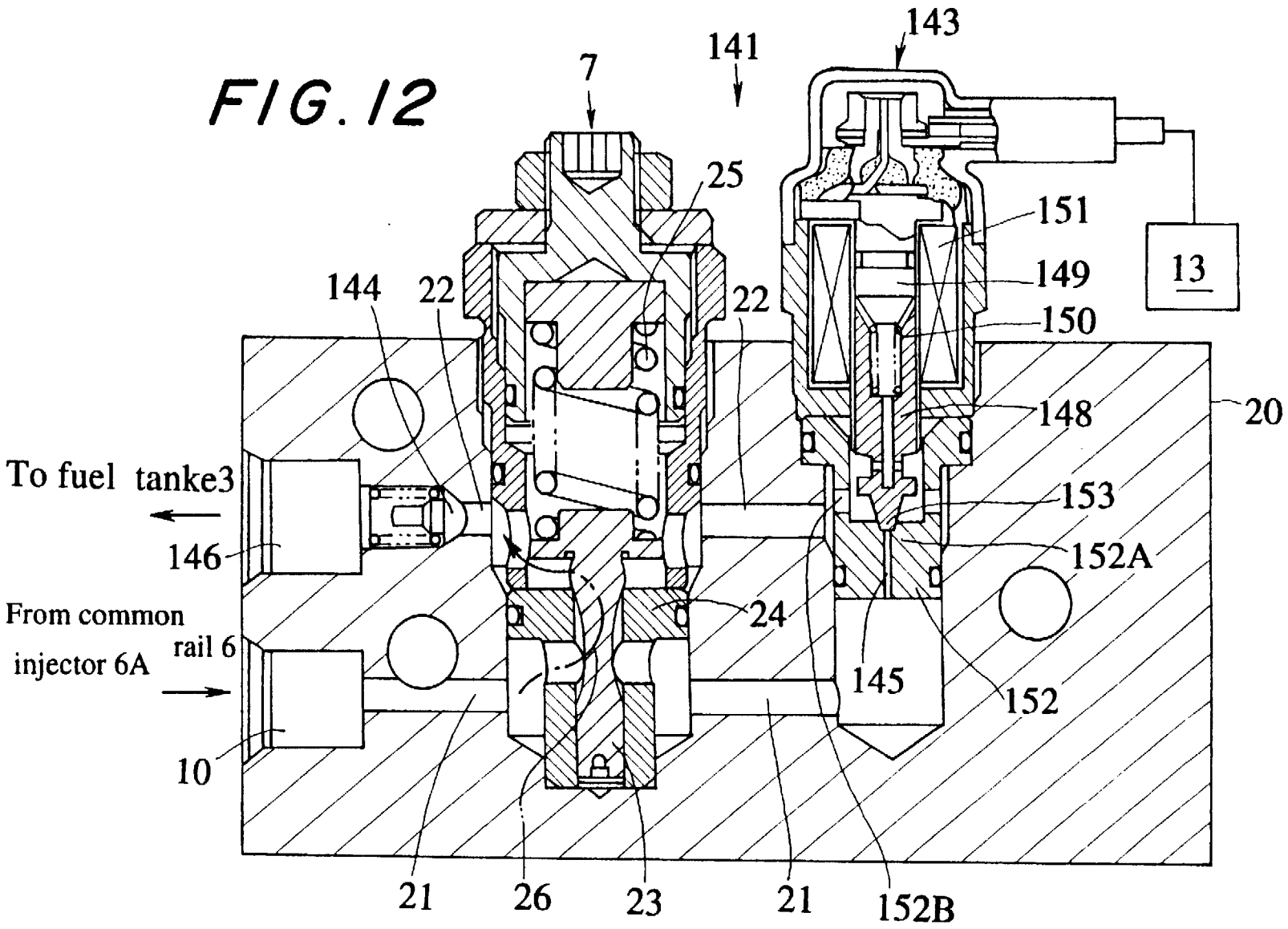
FIG. 12 is a sectional view of the above solenoid valve unit 141.

FIG. 12 is a sectional view of the solenoid valve unit 141; the high-pressure control valve 7 has substantially the same configuration as the valve 7 of FIGS. 2, 5 and 8. The check valve 144 is arranged downstream of the low-pressure passage 22. The solenoid valve 143 straddles the high-pressure passage 21 and the low-pressure passage 22, and is provided with an armature 148, a spring seat member 149, a solenoid spring 150, a solenoid 151, a valve seat member 152 and a valve element 153. The valve element 153 is formed as an integral part of the armature 148. The valve element 153 seats on a seat face 152A of the valve seat member 152. The valve seat member 152 has a passage 152B that can provide communication between the high-pressure passage 21 and the low-pressure passage 22, via the orifice 145. The opening pressure of the low-pressure control valve 142 is greater than that of the check valve 144.

Figures 13, 14:
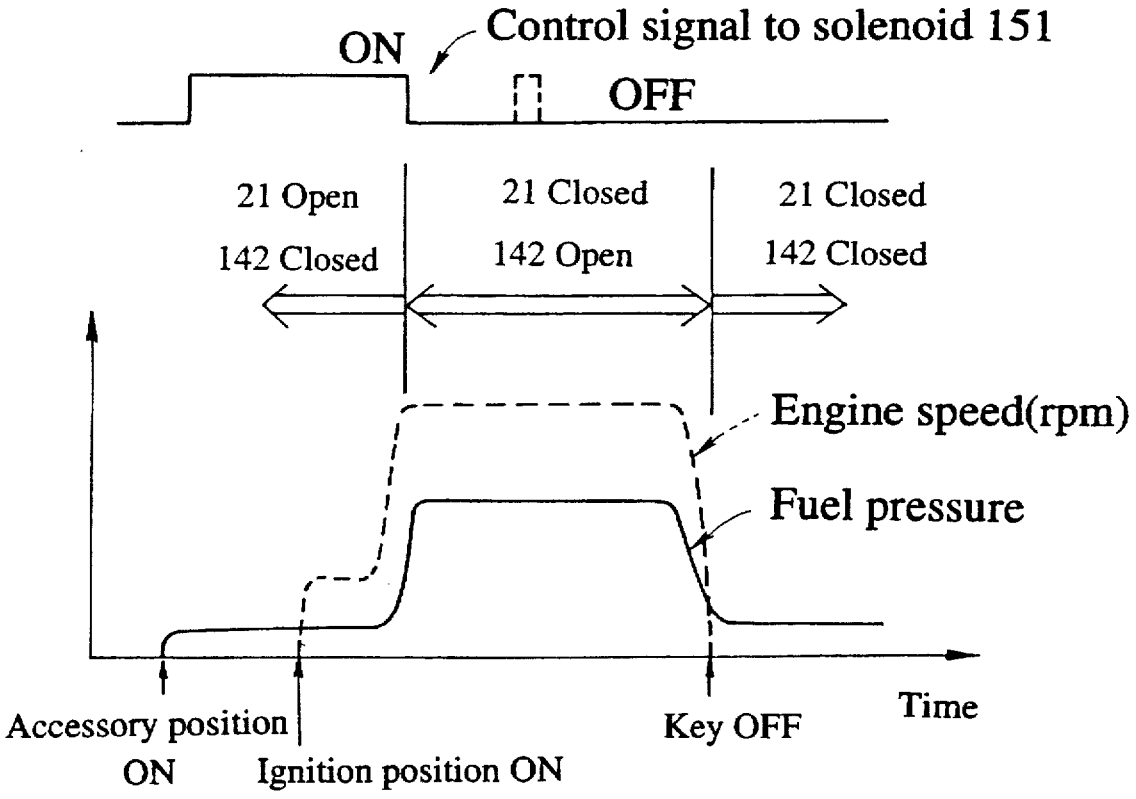
FIG. 13 is a is a chart showing the operating states of the various elements of the above solenoid valve unit.
FIG. 14 is a graph showing the relationship between engine speed and the pressure of fuel to the injector 6A.

The operating states of the elements in the solenoid valve unit 141 thus configured is shown in FIG. 13, and will now be described, with reference also to the graph of FIG. 14 showing the relationship between engine speed and fuel pressure. Setting the solenoid valve 143 on during engine startup causes the valve element 153 to be lifted from the face 152A of the valve seat member 152, opening communication between the high-pressure passage 21 and the low-pressure passage 22, as indicated in FIG. 13. Because the opening pressure of the low-pressure control valve 142 is greater than that of the check valve 144, the low-pressure control valve 142 is closed.

With communication thus opened between the high-pressure passage 21 and the low-pressure passage 22, there is no rise in pressure in the passage 21, resulting in low fuel pressure at the common rail 6 and injector 6A of FIG. 11, making it possible to start the engine with the low-pressure fuel delivery provided by low-pressure pump 4 (refer to the "Pump Used" column in FIG. 13). The large flow of low-pressure fuel delivered at a constant rate by the low-pressure pump 4 fills the fuel piping, suppressing fuel vaporization. The cooling and lubrication of the high-pressure pump 5 are effected by the large flow of fuel from the low-pressure pump 4.

Reverting to FIG. 13, once the engine has been started and is running normally under high-pressure fuel injection, the solenoid valve 143 is switched off to close communication between the high-pressure passage 21 and low-pressure passage 22 by seating the valve element 153 on the seat face 152A. As a result, high pressure is produced in the high-pressure passage 21 and at the common rail 6 and injector 6A, and high-pressure injection by the high-pressure pump 5 takes place. Switching the solenoid valve 143 off causes the pressure to rise in the high-pressure passage 21, resulting in high pressure at the common rail 6 and injector 6A. Opening the low-pressure control valve 142 allows normal cooling and lubrication by the fuel of the high-pressure pump 5.

With respect to changes over time in the pressure of fuel going to the common rail 6 and injector 6A and the engine speed, as shown by FIG. 14, when the key is turned to the accessory on position (not shown), the low-pressure pump 4 is activated and raises the fuel pressure. The engine is cranked by turning the key further, to the ignition on position (not shown). Until the key is turned to the ignition on position, communication between the high-pressure passage 21 and low-pressure passage 22 is open and the low-pressure control valve 142 closed. When the ignition is switched on, as described above, the engine is started using low-pressure fuel delivery by the low-pressure pump 4.

Switching the solenoid valve 143 over from on to off allows communication to be closed between the high-pressure passage 21 and low-pressure passage 22, and the low-pressure control valve 142 to be opened. Turning the key to the off position closes communication between the high-pressure passage 21 and low-pressure passage 22 and closes the low-pressure control valve 142. As the check valve 144 is located downstream of the solenoid valve 143 and high-pressure control valve 7, a prescribed low pressure can be maintained even after the engine has stopped.

A high-pressure opposition type valve configuration is used in which the valve element 153 is urged onto the seat face 152A against the high pressure, to close the high-pressure passage 21. Therefore, only two control stages are required, to switch the solenoid valve 143 on when the engine is being started, and switch the solenoid valve 143 off when the engine is operating normally. Compared to the three-stage control of the solenoid valve unit 60 (FIGS. 7 to 10) consisting of switching it off at engine startup, on after the engine is fully operational, and off again when the engine is operating normally, rather than not functioning until the engine is stopped, control is simpler, with the valve element 153 functioning as soon as the solenoid valve 143 is switched off.

Moreover, as shown by FIG. 13, even after the engine has started up and is running normally, during low-pressure operation in particular, when the solenoid valve 143 is switched from off to on the valve element 153 immediately becomes operational. Switching the solenoid valve 143 on causes the valve element 153 to be lifted from the seat face 152A, opening communication between the high-pressure passage 21 and low-pressure passage 22, as at engine startup time. As the check valve 144 has a lower opening pressure than that of the low-pressure control valve 142, the low-pressure control valve 142 remains closed, so a prescribed amount of fuel is supplied to the common rail 6 and injector 6A not by the high-pressure pump 5, but instead by the low-pressure pump 4.

Figure 15:
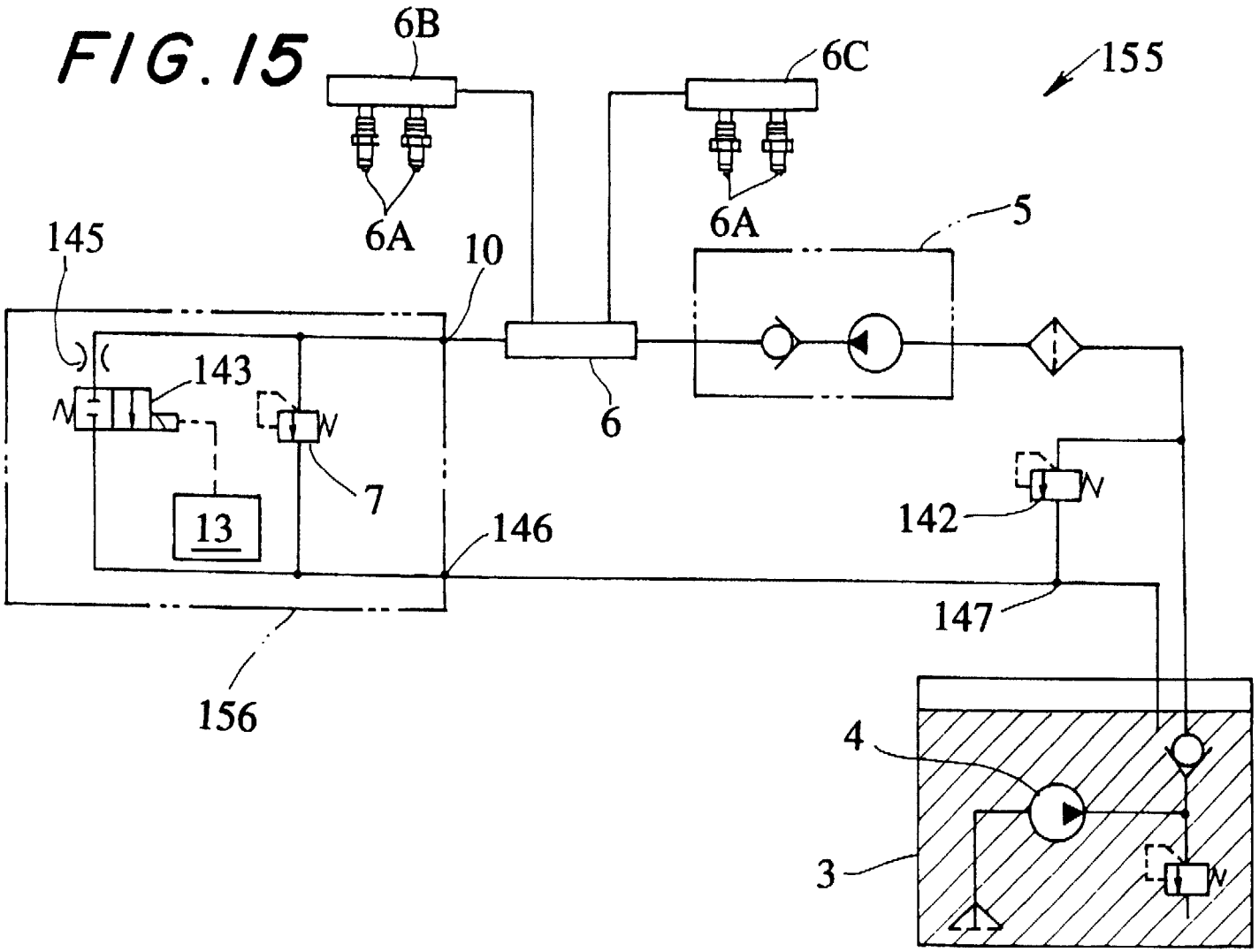
FIG. 15 is a schematic diagram of a fuel injection apparatus 155 equipped with a solenoid valve unit 156 in a fifth embodiment according to the third aspect of the invention.
Figure 16:
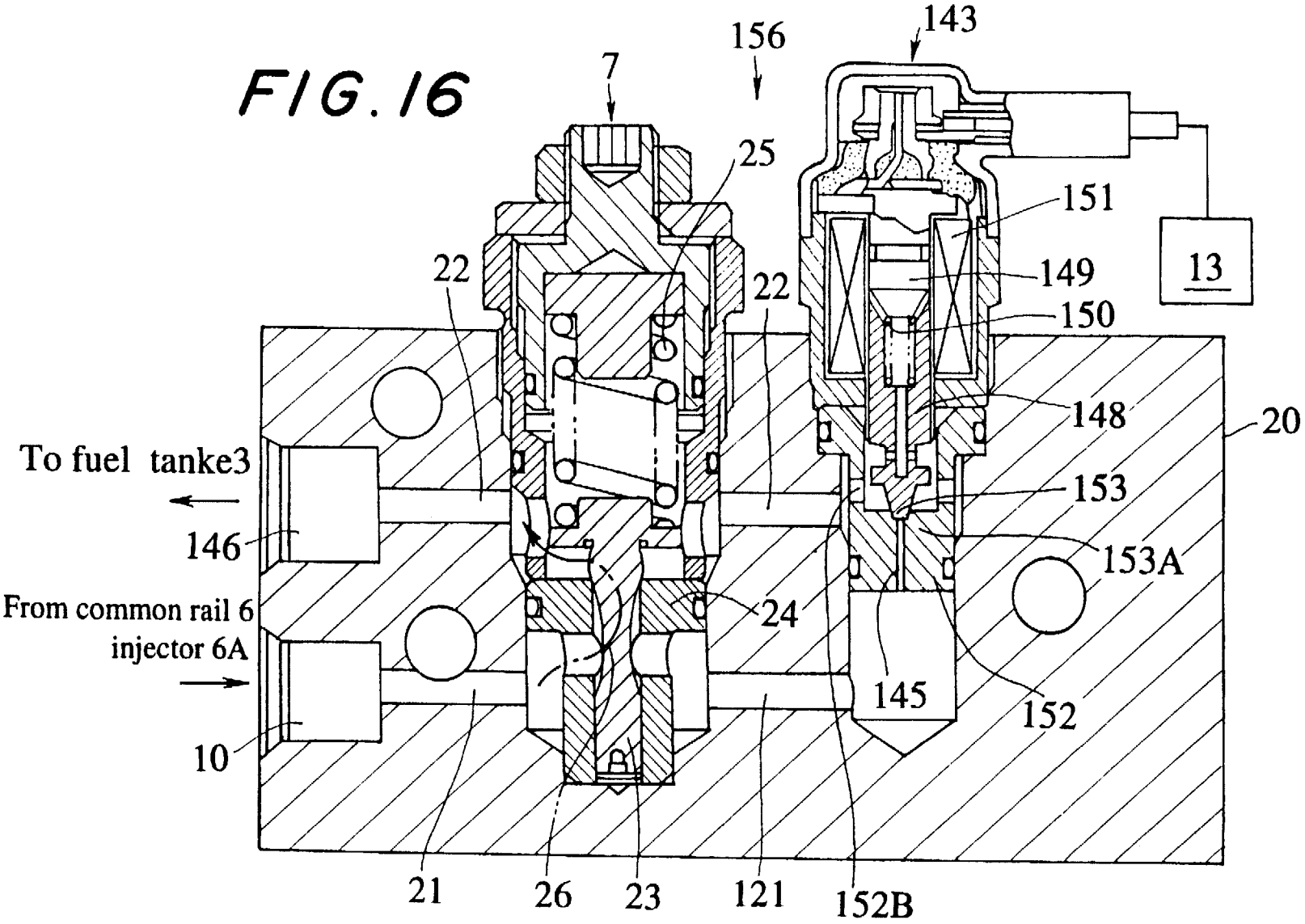
FIG. 16 is a sectional view of the above solenoid valve unit 156.

By giving the orifice 145 communicating with the high-pressure passage 21 a prescribed diameter that causes the opening pressure at which the low-pressure control valve 142 is set to exceed the high-pressure passage 21 pressure when the solenoid valve 143 is on (open), the need for the check valve 144 is eliminated. This will now be described with reference to a fifth embodiment of a solenoid valve unit 156 for a fuel injection apparatus 155 according to the third aspect of the invention, as shown in FIG. 15 and the sectional view of the solenoid valve unit 156 shown in FIG. 16. In addition to the solenoid valve unit 156, the fuel injection apparatus 155 is provided with a fuel tank 3, low-pressure pump 4, high-pressure pump 5, low-pressure control valve 142 for the high-pressure pump 5, a common rail 6 and an injector 6A. The difference between solenoid valve unit 156 and the solenoid valve unit 141 of FIGS. 11 and 12 is that there is no check valve 144, and a diameter has been selected for the orifice 145 which ensures that the set opening pressure of the low-pressure control valve 142 exceeds the high-pressure passage 21 pressure when the solenoid valve 143 is open (on). The solenoid valve unit 156 thus configured provides the same effects as those of the solenoid valve unit 141 as shown in FIG. 13, so substantially the same description thereof applies and therefore may be omitted here.

If the diameter of the orifice 145 is increased, it is necessary to increase the strength of the solenoid spring 150 used in the solenoid valve 143, which is to say it is necessary to use a stronger (larger) solenoid valve 143. As such, there is a limit to the extent that just the diameter of the orifice 145 can be used to provide the low-pressure control valve 142 with an opening pressure that is greater than the pressure of the high-pressure passage 21. Beyond that limit, it is necessary to use a solenoid valve unit 141 provided with a check valve 144, as in the arrangement illustrated by FIGS. 11 and 12.

Figure 17:
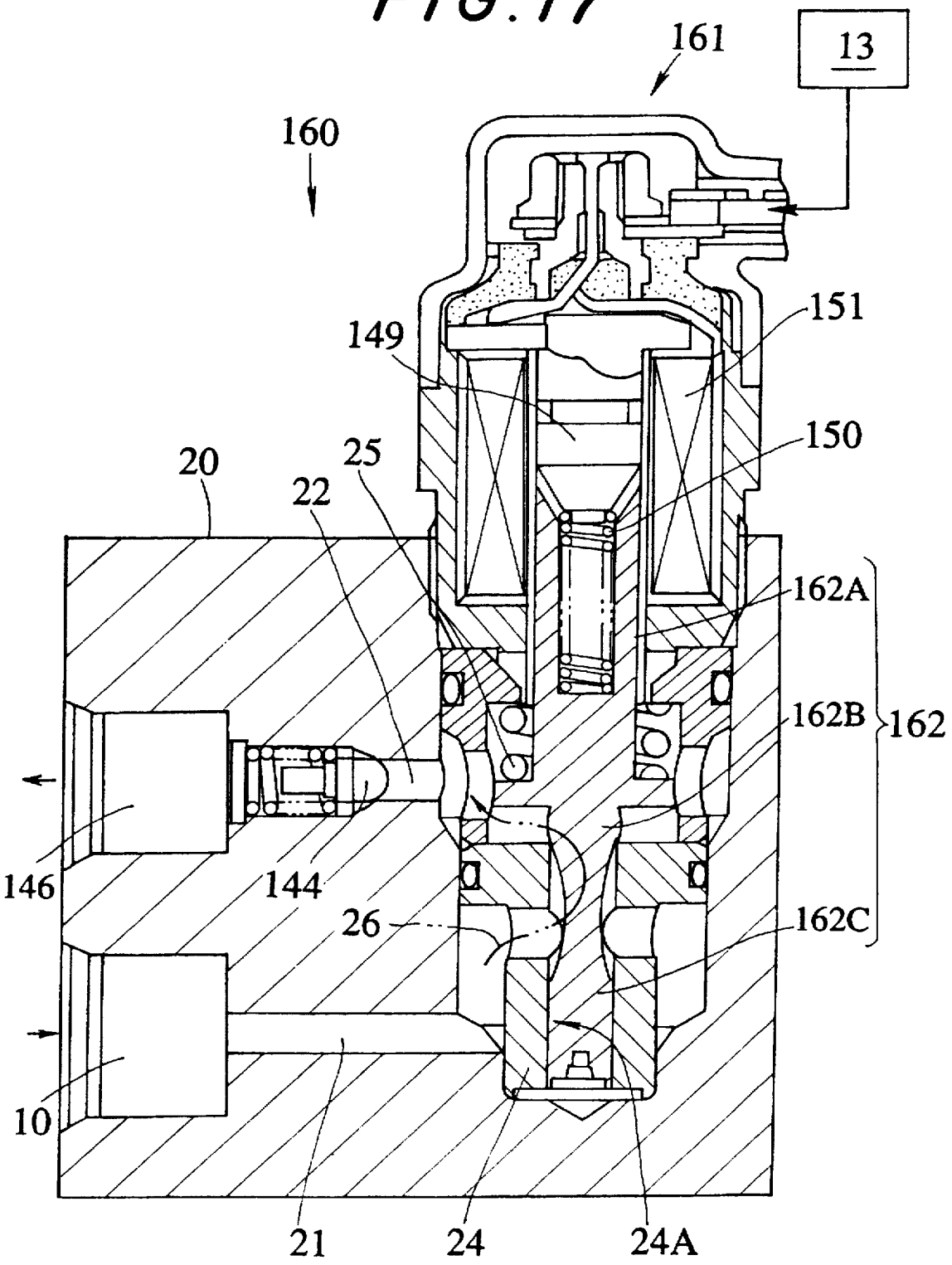
FIG. 17 is a schematic diagram of a fuel injection apparatus equipped with a solenoid valve unit 160 in a sixth embodiment according to the fourth aspect of the invention.

A solenoid valve unit 160 of a sixth embodiment according to the fourth aspect of the invention will now be described with reference to FIG. 17. This embodiment is characterized in that the solenoid valve 143 and high-pressure control valve 7 portions of the preceding embodiment (the second aspect of the invention) are integrated. FIG. 17 is a sectional view of the solenoid valve unit 160, which is provided with a check valve 144 and a solenoid valve 161 in a valve unit housing 20. The solenoid valve unit 141 (FIG. 12) and high-pressure control valve 7 of the fourth embodiment are integrated together in the case of the solenoid valve 161, which has a needle valve 162 which integrates an armature damper portion 162A, a valve element portion 162B and a damper portion 162C. In the needle valve 162, the valve element 23 of the high-pressure control valve 7 and the armature 148 and element 153 of the solenoid valve 143 are integrated and used in common.

The armature portion 162A receives the action of the solenoid 151 and the solenoid spring 150 and the valve element portion 162B receives the action of the pressure adjustment spring 25, to thereby open and close communication between the high-pressure passage 21 and the low-pressure passage 22. A damping effect is produced by the sliding movement of the damper portion 162C in a cavity 24A in the valve seat member 24. The solenoid spring 150 may be omitted by setting the force of the spring 25 at an appropriate level. With the solenoid valve unit 160 thus configured, switching the solenoid 151 on causes the armature portion 162A to be drawn upwards, with reference to the drawing, lifting the valve element portion 162B off the valve seat member 24 and thereby opening communication between the high-pressure passage 21 and low-pressure passage 22.

Thus, as in the case of the solenoid valve unit 141, during engine startup a prescribed amount of fuel can be supplied to the common rail 6 and injector 6A by the low-pressure pump 4 instead of the high-pressure pump 5. Switching the solenoid 151 off causes the valve element portion 162B to be seated on the valve seat member 24, closing communication between the high-pressure passage 21 and low-pressure passage 22. The same function as that of the high-pressure control valve 7 can be realized by opening and closing the valve element portion 162B according to the opening pressure of the spring 25 and the fuel pressure.

With respect to the operation of the needle valve 162 thus configured, transitory or abnormal variations in the pressure of the fuel from the high-pressure passage 21 can be damped and overshoot and undershoot prevented by the damper portion 162C sliding in the cavity 24A while a prescribed oil-tightness is maintained, imparting the type of stability provided by a high-pressure control valve 7. In this embodiment the damper portion 162C is arranged on the high-pressure passage 21 side, i.e. the high-pressure side. However, it can also be arranged on the low-pressure passage 22 side, i.e. the low-pressure side.

Figure 18:
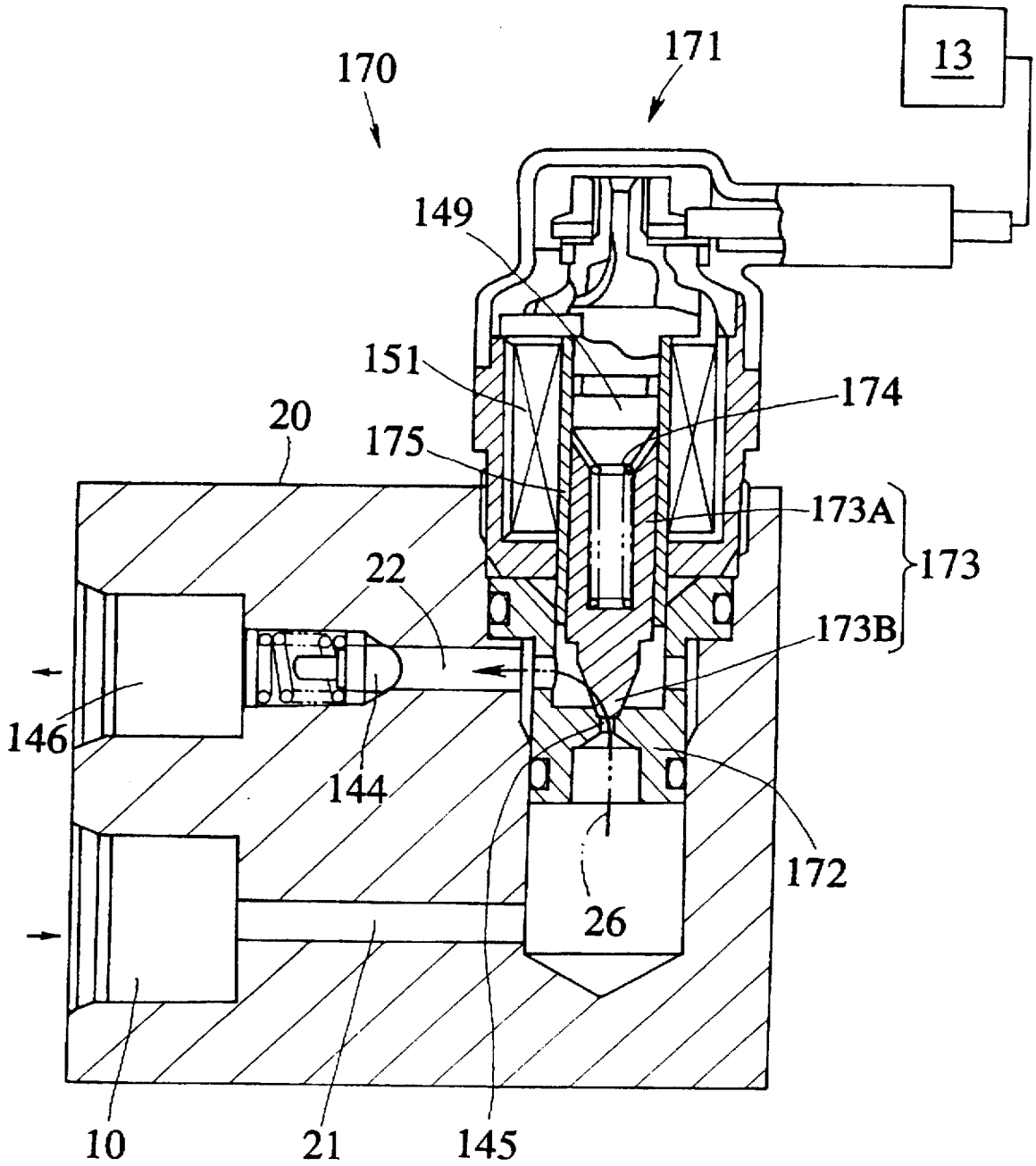
FIG. 18 is a schematic diagram of a fuel injection apparatus equipped with a solenoid valve unit 170 in a seventh embodiment according to the fourth aspect of the invention.

FIG. 18 is a sectional view of a solenoid valve unit 170 with a solenoid valve 171 and a damper portion provided on the low-pressure side, according to a seventh embodiment. The solenoid valve 171 has a valve seat member 172 corresponding to the valve seat member 24, a needle valve 173 corresponding to the needle valve 162, and a pressure adjustment spring 174 corresponding to the spring 25 and solenoid spring 150. Integrally formed in the needle valve 173 are a portion 173A in which armature and damper portions are integrated, and a valve element portion 173B that is seated on the valve seat member 172. The damper portion 173A slides vertically within a cylindrical member 175. With the solenoid valve unit 171 thus configured, switching the solenoid 151 on causes the armature damper portion 173A to be drawn upwards, with reference to the drawing, lifting the valve element portion 173B away from the valve seat member 172, thereby opening communication between the high-pressure passage 21 and low-pressure passage 22.

Thus, as in the case of the solenoid valve unit 141, during engine startup the required amount of fuel can be supplied to the common rail 6 and injector 6A by the low-pressure pump 4 instead of the high-pressure pump 5. Switching the solenoid 151 off causes the valve element portion 173B to be seated on the valve seat member 172, closing communication between the high-pressure passage 21 and low-pressure passage 22. The same function as that of the high-pressure control valve 7 can be realized by opening and closing the valve element portion 173B according to the opening pressure of the spring 174 and the fuel pressure. The check valve 144 may be omitted, as in the third aspect of the invention, by optionally setting the diameter of the orifice 145 opened and closed by the valve element portion 173B.

With respect to the operation of the needle valve 173 thus configured, transitory or abnormal variations in the pressure of the fuel from the high-pressure passage 21 can be damped and overshoot and undershoot prevented by the armature damper portion 173A sliding in the cylindrical portion 175 while a prescribed oil-tightness is maintained, imparting the type of stability provided by a high-pressure control valve 7. The solenoid valve 171 thus configured according to the seventh embodiment provides the effects of the high-pressure control valve 7 and solenoid valve 143 while also providing the same damper effect as that of the solenoid valve 161 of the sixth embodiment (FIG. 17).

Figure 19:
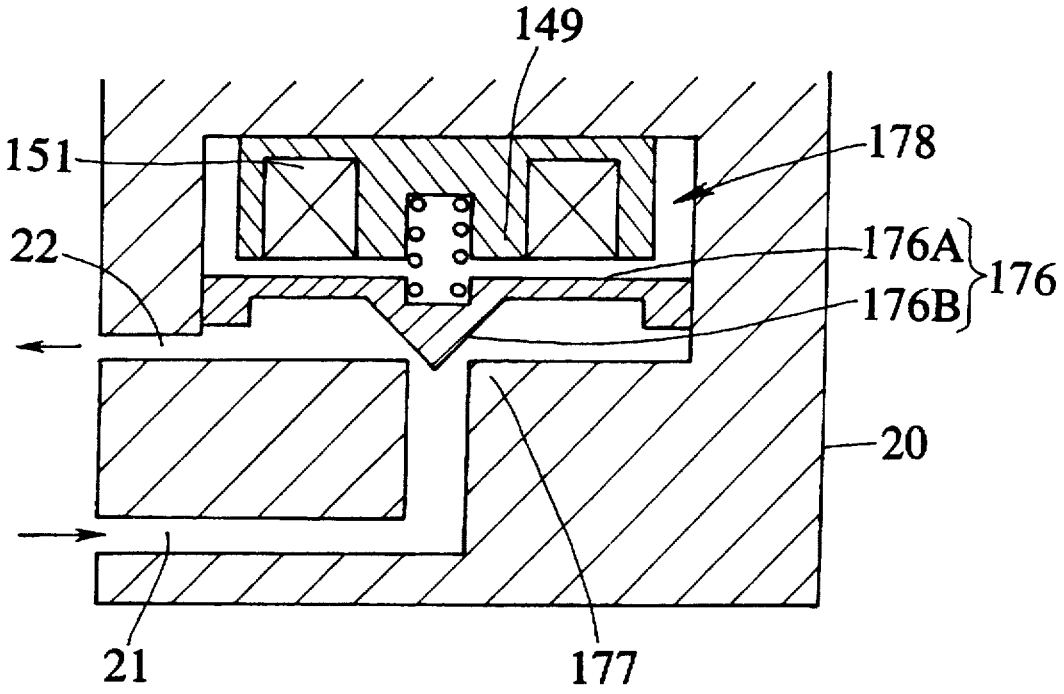
FIG. 19 is a sectional view of the principal parts of a solenoid valve unit of the fourth aspect of the invention in which a flat plate shaped valve element 176 is used.

The damping effect can be increased by using a flat plate shaped valve element 176, such as the one shown in FIG. 19, instead of the rod shaped types of needle valves 162 and 173. The valve element 176 is constituted by a portion 176A formed by integrating a flat plate shaped armature portion and a peripheral flange shaped damper portion, and a conical valve element 176B that seats on a valve seat portion 177 that opens into the high-pressure passage 21. The armature damper portion 176A slides vertically within a solenoid chamber 178.

Figure 20:
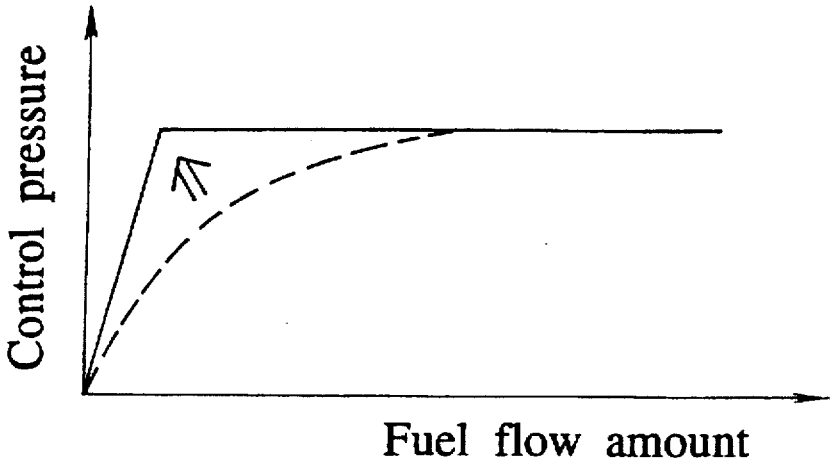
FIG. 20 is a graph showing the relationship between flow amount and control pressure on the solenoid valve in the above arrangement.

The damping effect can be increased by increasing the sectional area of the armature damper portion 176A used as the armature. Using a configuration in which the solenoid valve 143 and high-pressure control valve 7 portions are integrated as in the solenoid valve 161 and solenoid valve 171 will mean there is just one seat portion, as in the case of valve seat member 24 (FIG. 17) and valve seat member 172 (FIG. 18). As shown by FIG. 20, the result is that even with a low flow rate, there is no decline in the control pressure of solenoid valves 161 and 171 (indicated by the solid line), so a constant pressure can be maintained.

As described in the foregoing, in the solenoid valve unit according to the present invention, during engine startup fuel is delivered to the injector under low pressure by a low-pressure pump. This prevents fuel vaporization during hot restarts and enables high-pressure fuel delivery by the high-pressure pump during normal high-pressure engine operation. The result is that stable engine operation can be achieved.

Furthermore, according to the first aspect of the invention, even when just one solenoid valve is used, two passages can be controlled, one on the high-pressure side of the pressure control valve and the other on the return port side. Such a configuration allows costs to be reduced and high pressures to be controlled by a small force, ensuring reliable opening and closing of the passages.

In another embodiment according to the second aspect of the invention, in which a check valve is used, the low-pressure control valve of the high-pressure pump is given a higher opening pressure than that of the check valve, so that even after the engine has been started and is operating normally, by controlling the solenoid valve, it is possible to use high-pressure or low-pressure fuel delivery as required. In another embodiment according to the third aspect of the invention, in which an orifice is used instead of a check valve, the same effect is obtained by setting the orifice to an appropriate size.

A further arrangement according to the fourth aspect of the invention in which the high-pressure control valve and the solenoid valve are integrated helps to reduce costs, decrease the overall size and provide higher reliability.

What is claimed is:

1. A fuel injection apparatus comprising:

a low-pressure pump that supplies fuel at low pressure from a fuel tank, an injector, a high-pressure pump that is connected with and that receives the low-pressure fuel from the low-pressure pump and that supplies the fuel at high pressure to the injector that injects the fuel at high pressure into an engine, a solenoid valve unit comprising:

a unit housing provided with a high-pressure lead-in port from the injector, a low-pressure lead-out port to the fuel tank, a return port from the high-pressure pump, a high-pressure passage in communication with the lead-in port, a low-pressure passage in communication with the lead-out port, and a return port passage in communication with the return port, a pressure control valve that opens and closes the high-pressure and low-pressure passage in accordance with pressure at the lead-in port, and solenoid valves able to communicate with the lead-in port and lead-out port via the pressure control valve and able to open and close communication between the high-pressure passage and the low-pressure passage, and between the low-pressure passage and the return port passage, wherein the solenoid valves are controlled to open communication between the high-pressure passage and the low-pressure passage and close communication between the low-pressure passage and the return port passage during engine startup, and to close communication between the high-pressure passage and the low-pressure passage, and open communication between the low-pressure passage and the return port passage during normal engine operation.

2. An apparatus according to claim 1 wherein the solenoid valves comprise a first solenoid valve that opens and closes communication between the high-pressure passage and the low-pressure passage and a second solenoid valve that opens and closes communication between the low-pressure passage and the return port passage.

3. An apparatus according to claim 2 wherein after the engine is operating normally, the solenoid valves are such that communication between the high-pressure passage and the low-pressure passage is closed by setting the first solenoid valve to off and communication between the low-pressure passage and the return port passage is opened by setting the second solenoid valve to off.

4. An apparatus according to claim 2 wherein after the engine is operating normally, the solenoid valves are such that communication between the high-pressure passage and the low-pressure passage is closed by setting the first solenoid valve to on and communication between the low-pressure passage and the return port passage is opened by setting the second solenoid valve to off.

5. An apparatus according to claim 2 wherein the first solenoid valve and the second solenoid valve both have the same configuration.

6. An apparatus according to claim 1 wherein the solenoid valve uses a single armature to drive a first valve element that opens and closes communication between the high-pressure passage and the low-pressure passage and a second valve element that opens and closes communication between the low-pressure passage and the return port passage.

7. An apparatus according to claim 6 wherein after the engine is operating normally communication between the high-pressure passage and the low-pressure passage is closed and communication between the low-pressure passage and the return port passage is opened by setting the solenoid valve to on.

8. An apparatus according to claim 6 wherein there is a valve seat member that is provided with a connecting rod that connects the first valve element with the second valve element and in which are formed a first seat face for the first valve element, a second seat face for the second valve element, and a connecting passage that can provide communication between the high-pressure passage and the low-pressure passage, and between the return port passage and the low-pressure passage.

9. A fuel injection apparatus comprising:

a low-pressure pump that supplies fuel at low pressure from a fuel tank, an injector, a high-pressure pump that is connected with and that receives the low-pressure fuel from the low-pressure pump and that supplies the fuel at high pressure to the injector that injects the fuel at high pressure into an engine, a solenoid valve unit comprising:

a unit housing provided with a high-pressure lead-in port from the injector, a low-pressure lead-out port to the fuel tank, a high-pressure passage in communication with the lead-in port, and a low pressure passage in communication with the lead-out port, a high-pressure control valve that opens and closes the high-pressure passage and low-pressure passage in accordance with pressure at the lead-in port, a solenoid valve that is able to communicate with the lead-in port and lead-out port via the high-pressure control valve and can open and close communication between the high-pressure passage and the low pressure passage, a check valve arranged between the low-pressure passage and the fuel tank, and a low-pressure control valve arranged between the high-pressure pump and the fuel tank, wherein an opening pressure of the low-pressure control valve is set at a higher pressure than the valve opening pressure of the check valve and the solenoid valve is controlled to open communication between the high-pressure passage and the low-pressure passage during engine startup, and to close communication between the high-pressure passage and the low-pressure passage during normal engine operation.

10. An apparatus according to claim 9 wherein the low-pressure control valve is arranged closer to the fuel tank than the check valve is to the fuel tank.

11. A fuel injection apparatus comprising:

a low-pressure pump that supplies fuel at low pressure from a fuel tank, an injector, a high-pressure pump that is connected with and that receives the low-pressure fuel from the low-pressure pump and that supplies the fuel at high pressure to the injector that injects the fuel at high pressure into an engine, a solenoid valve unit comprising:

a unit housing provided with a high-pressure lead-in port from the injector, a low-pressure lead-out port to the fuel tank, a high-pressure passage in communication with the lead-in port, and a low pressure passage in communication with the lead-out port, *said high-pressure passage having an orifice formed therein,* a high-pressure control valve that opens and closes the high-pressure passage and low-pressure passage in accordance with pressure at the lead-in port, a solenoid valve that is able to communicate with the lead-in port and lead-out port via the pressure control valve and can open and close communication between the high-pressure passage and the low-pressure passage, and a low-pressure control valve arranged between the high-pressure pump and fuel tank, wherein the orifice in the high-pressure passage is of a diameter that allows the valve opening pressure of the low-pressure control valve to be set at a higher pressure than the pressure in the high-pressure passage when the solenoid valve is set at open and the solenoid valve is controlled to open communication between the high-pressure passage and the low-pressure passage during engine startup, and to close communication between the high-pressure passage and the low-pressure passage during normal engine operation.

12. An apparatus according to claim 11 wherein the low-pressure control valve is arranged closer to the fuel tank than the orifice is to the fuel tank.

13. A fuel injection apparatus comprising:

a low-pressure pump that supplies fuel at low pressure from a fuel tank, an injector, a high-pressure pump that is connected with and that receives the low-pressure fuel from the low-pressure pump and that supplies the fuel at high pressure to the injector that injects the fuel at high pressure into an engine, a solenoid valve unit comprising:

a unit housing provided with a high-pressure lead-in port from the injector, a low-pressure lead-out port to the fuel tank, a high-pressure passage in communication with the lead-in port, and a low-pressure passage in communication with the lead-out port, [said high-pressure passage having an orifice formed therein,]

a high-pressure control valve that opens and closes the high-pressure passage and low-pressure passage in accordance with pressure at the lead-in port, and a solenoid valve that can open and close communication between the high-pressure passage and the low-pressure passage, wherein the solenoid valve and the high-pressure control valve are integrated by making common use of a valve element thereof.

14. An apparatus according to any of claims 1, [9, 11] or 13 wherein the high-pressure control valve[, each of] *and* the solenoid [valves and the check valve and orifice] *valve* are formed in a single unit housing.

15. An apparatus according to claim 13 wherein a damper portion is formed on the low-pressure side of the solenoid valve.

16. An apparatus according to claim 15 wherein the solenoid valve is provided with an armature damper portion that slides vertically within a cylinder and a valve element portion that seats on a valve seat member opening to the high-pressure passage.

17. An apparatus according to claim 13 wherein a damper portion is formed on the high-pressure side of the solenoid valve.

18. An apparatus according to claim 17 wherein the solenoid valve is provided with a needle valve in which are integrated a damper portion on the high-pressure side that slides within a cavity in the valve seat member, an armature portion, and a valve element portion that seats on the valve seat member opening to the high-pressure passage.

19. An apparatus according to claim 13 wherein the solenoid valve and the high-pressure control valve body are formed as a flat plate shaped valve element.

20. An apparatus according to claim 19 wherein the flat plate shaped valve element is provided with an armature damper portion that slides vertically along the inner wall of a solenoid chamber formed in the unit housing, and a valve element portion that seats on a valve seat member opening to the high-pressure passage.

21. An apparatus according to claim 13 wherein the solenoid valve is configured as a high-pressure action type in which the element can close communication between the high-pressure passage and the low-pressure passage when subjected to high pressure from the high-pressure passage.

22. An apparatus according to any of claims 9, 11 or 13 wherein the solenoid valve is configured as a high-pressure opposition type in which when the solenoid thereof is in an off state communication between the high-pressure passage and the low-pressure passage can be closed in opposition to high pressure from the high-pressure passage.

23. An apparatus according to any of claims 9 or 11 wherein the high pressure control valve and the solenoid valve are arranged in parallel between the high-pressure lead-in port and the low-pressure lead-out port.

24. An apparatus according to any of claims 9, 11 or 13 wherein the high-pressure passage and the low-pressure passage are formed parallel to each other and are straddled by at least one of the high-pressure control valve and the solenoid valve.

*25. An apparatus according to claim 9 wherein the check valve is formed in a single unit housing.*

*26. An apparatus according to claim 11 wherein the orifice is formed in a single unit housing.*

*27. An apparatus according to claim 13 wherein the high pressure passage having an orifice which is formed in a single unit housing.*

* * * * *